(12) United States Patent
Ding et al.

(10) Patent No.: US 7,049,393 B2
(45) Date of Patent: May 23, 2006

(54) TECHNIQUES FOR THE PREPARATION OF HIGHLY FLUORINATED POLYETHERS

(75) Inventors: Jianfu Ding, Gloucester (CA); Futian Liu, Montreal (CA); Ming Zhou, Ottawa (CA); Mei Li, Toronto (CA); Mike Day, Gloucester (CA); Pascal Vuillaume, St. Antoine (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 10/481,020

(22) PCT Filed: May 28, 2003

(86) PCT No.: PCT/CA03/00779

§ 371 (c)(1),
(2), (4) Date: May 17, 2004

(87) PCT Pub. No.: WO03/099907

PCT Pub. Date: Dec. 4, 2003

(65) Prior Publication Data

US 2004/0198906 A1    Oct. 7, 2004

Related U.S. Application Data

(60) Provisional application No. 60/383,148, filed on May 28, 2002, provisional application No. 60/433,574, filed on Dec. 16, 2002.

(51) Int. Cl.
*C08G 59/06* (2006.01)
*C08F 6/06* (2006.01)
(52) U.S. Cl. .................. 528/488; 528/86; 528/397; 528/401; 528/491; 528/497; 528/501; 528/502 R; 528/503

(58) Field of Classification Search .................. 528/56, 528/401, 397, 491, 488, 497, 501, 502 R, 528/503, 86
See application file for complete search history.

(56) References Cited

U.S. PATENT DOCUMENTS 4,473,684 A    9/1984    Maresca et al.

(Continued)

FOREIGN PATENT DOCUMENTS

EP    0 211 693    2/1987

(Continued)

*Primary Examiner*—Duc Truong
(74) *Attorney, Agent, or Firm*—J. Wayne Anderson

(57) ABSTRACT

A process for preparing a fluorinated poly(arylene ether) comprising the repeating unit:

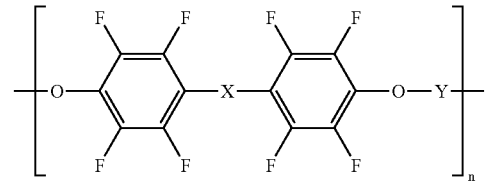

wherein n provides a molecular weight up to about 30,000 to 100,000, X represents one of following groups: none, ketone, sulfone, sulfide, ether, hexafluoroisopropylidene, αω-perfluoroalkylene, oxadiazole, and Y is 4,4'-(hexafluoroisopropylidene)-diphenyl, 4,4'-isopropylidene diphenyl, 3,3'-isopropylidene diphenyl, phenyl, or chlorinated phenol which process comprises reacting a bis(pentafluorophenyl) compound and a bisphenol or hydroquinone in the presence of a dehydrating agent and a polar aprotic solvent is disclosed. Polymers resulting from the process show good promise as new passive optic polymer waveguide materials.

6 Claims, 9 Drawing Sheets

U.S. PATENT DOCUMENTS

| | | |
|---|---|---|
| 4,774,311 A | 9/1988 | Kelsey |
| 4,973,653 A | 11/1990 | Eldin |
| 5,114,780 A | 5/1992 | Mercer et al. |
| 5,115,082 A | 5/1992 | Mercer et al. |
| 5,155,175 A | 10/1992 | Mercer et al. |
| 5,179,188 A | 1/1993 | Mercer et al. |
| 5,204,416 A | 4/1993 | Mercer et al. |
| 6,136,929 A | 10/2000 | Han et al. |
| 2002/0115815 A1* | 8/2002 | Lee et al. .................... 528/171 |

FOREIGN PATENT DOCUMENTS

| | | |
|---|---|---|
| EP | 1219665 | 7/2002 |
| WO | 91 16369 | 10/1991 |
| WO | 91 16370 | 10/1991 |

* cited by examiner

4a

4b

6a

6b

TECHNIQUES FOR THE PREPARATION OF HIGHLY FLUORINATED POLYETHERS

This application is a National Stage application of PCT Application PCT/CA03/00779 filed May 28, 2003 which claims benefit of U.S. Provisional Application 60/383,148 filed May 28, 2002 and U.S. Provisional Application 60/433,574 filed Dec. 16, 2002.

BACKGROUND OF THE INVENTION

There is a growing interesting in the development of new passive optic polymer waveguide materials for telecommunication applications such as a thermo-optic switching, optical wavelength filters, beam splitters, optical connectors and arrayed waveguide gratings (AWG). Polymers, because of their excellent low-temperature processability and their ability to be chemically modified or blended with other polymers, are ideal candidates as waveguide materials, since the optical properties can be tailored to requirements. Polymer waveguides also offer the potential to be incorporated into highly complex integrated devices and optical interconnects on a planar substrate.

The requirements for the ideal passive optical polymer material are:

Low optic loss at 1.3~1.55 µm.
Low birefringence, $\Delta n < 5 \times 10^{-5}$.
Adjustable refractive index.
Crosslinkable (photo- or thermal-). Good substrate adhesion.
High mechanical strength.
High Tg (>120° C.).
Good processing properties (coating, etching, dicing, etc.)
High durability when incorporated into a device (e.g. high Tg, low water up-take, high chemical and environmental resistance.

Many attempts have been made to produce polymers that meet the above criteria. For example, several polymers have been prepared in which fluorine or deuterium has been used to replace hydrogen in the molecular structure. Polymers prepared with these substituents have been shown to reduce optic losses. However, when these materials have been tested in optic waveguides applications, only a few have shown satisfactory performance (these materials are summarized in Table 1). In terms of waveguide applications, the polymers based upon the fluorinated polyethers (FPAE and FPEK) are considered to be the best candidates, since they offer materials with: low optic loss, low birefringence, and good mechanical properties. However, based upon the "ideal" criteria listed above, it should be noted that even these materials fail to meet the criteria for optic loss and birefringence.

TABLE 1

Polymers used for planar passive optic waveguides

| Polymer | Tg (° C.) | loss, 1.55 mm (dB/cm) | N | $\Delta n$ | notes |
|---|---|---|---|---|---|
| PFPs-PGMA | 82–97 | 0.42 | 1.46–1.475 | $4 \times 10^{-4}$ | RIT, Sweden |
| F-polyacrylate | 100–150 | 0.6 | 1.3~1.5 | | AlliedSignal |
| PFCB | 120–350 | 0.2 | 1.46–1.54 | | Clemson U. Dow |
| FPAE | 167(240)* | 0.2 | 1.495–1.530 | $7.8 \times 10^{-3}$ | Korea |
| FPEK | 149(202)* | <0.5 | 1.51 | $1.4–4.6 \times 10^{-3}$ | Monash U. Korea |
| polycyanurate | ~250 | 0.6 | ~1.51 | | Germany |
| Cl-Polyimide | | 0.4 | 1.51–1.57 | $1.0 \times 10^{-2}$ | Korea |
| F-Polyimide | | 0.5 | 1.52–1.55 | $0.57–1.58 \times 10^{-2}$ | Korea |

*crosslinked sample

In terms of chemical structure, one way to achieve a low optical loss material is to replace the hydrogen atoms in a polymer structure with fluorine atoms. Consequently the fluorinated polyethers (FPAE and FPEK), listed in Table 1, would be expected to have the lowest optical losses because they have higher fluorine content. Meanwhile, in order to obtain materials with variable refractive index the chemical structure of the polymers can be modified. This can be achieved by the incorporation of aliphatic groups, which will reduce the refractive index, or alternatively using aromatic groups, which increase the polymers higher refractive index. In addition a factor that affects a polymeric materials the birefringence is the chain orientation. Reducing the orientation in a polymer yields materials with low birefringence. The following represent ways of reducing the orientation to achieve a low birefringence material:

Highly flexible polymer chain.
Lower glass transition temperature polymers. However, it should be noted that this conflicts with the reliability of the device. The lowest Tg recommended for a durable reliable device is 120° C.
Low processing temperature (crosslinking, annealing, etc.)

Kim et al in Macromolecules (2001), 34:7817–7821 describe a process for preparing fluorinated poly(arylene ether sulfide) for polymeric optical waveguide devices employing a high temperature (120° C.) to ensure complete dehydration.

U.S. Pat. No. 6,136,929 (Han et al) discloses a method for making polyarylene ethers employing $K_2CO_3$ at 80° C. for 24 hours.

Japanese patent, JP2002194082 (Lee et al) discloses the preparation of fluorinated poly(arylene ether sulfide) and poly(arylene ether sulfone) for polymeric optical waveguide devices using azeotropic distillation at 120° C. for the removal of $H_2O$.

One of the drawbacks of the published techniques for the production of fluorinated polyethers is the high tendency of the side reaction on the ortho-position of bis(pentafluorophenyl) compounds, which leads to branching structures and even crosslinked microgels in the products.

There are 10 fluorines in the bis(pentafluorophenyl) compounds, and both para- and ortho-fluorines are reactive in the polycondensation reaction. Any reaction of ortho-fluorines will cause undesirable branching and even crosslinking structures, which is detrimental for the optical applications. Therefore, for preparing useful linear polymers, the selectivity of the reaction to the para-fluorines should be high.

Unfortunately, for the monomers with electron withdrawing group such as ketone, sulfone or oxadiazole as the X group (see Scheme 1), the selectivity is relative poor, and large amount branching structures, even crosslinked microgels were proved to form in the products by using the above mentioned techniques if the polymers with high molecular weight were prepared.

In the present invention, the polycondensation reaction was initially modified by the addition of a dehydrating thimble filled with molecular sieves or calcium hydride to dehydrate the condensed solvent from refluxing, which enables the preparation of linear polymers from a wide range of monomers with different linkage group X as listed in Scheme 1.

The polycondensation reaction has been further modified by using a $CaH_2$ mediated technique. This modified reaction is especially good for the preparation of the fluorinated aromatic polyethers from activated bis(pentafluorophenyl) compounds with electron withdrawing group (such as ketone, sulfone or oxadiazole) as the linkage unit X.

We have found that this novel process offers a wide range of advantages over existing processes. These include the following: mild reaction condition, less side reaction, the obtained product is free of any gel particles, white in colour, and the reaction is simple, fast and has a high degree of reproducibility and is easy to control and the reaction is applicable to many starting materials as described in Scheme 1 (see below).

Another drawback of the published techniques relates to the means of achieving the crosslinkability of the polymers. Because crosslinkable polymers have to be used in waveguide fabrication, crosslinking groups have to be introduced into polymers at the chain end or as side pendant groups. Based upon published information, only phenyl ethynyl or ethynyl groups have been suggested as the means of introducing crosslinking ability to the polymers. The reactions associated with these techniques involve a two-step process. First the polymer has to be prepared and purified, and then the purified polymer can be reacted with 4-phenyl ethynyl phenol (PEP) or with 3-ethynylphenol (EP) to yield the crosslinkable polymer with the crosslinker at the chain end.

There are several disadvantages associated with this technique:

Of the polymers prepared using this approach (only two) one is believed to have high impurity content making its use impractical for normal applications.

The crosslinking group is only attached to the chain end, thus its content in polymer is limited to a very low level.

PEP and EP are not commercial available and are difficult to prepare.

PEP and EP are not fluorinated compounds and the resultant polymers possess low fluorine content which give higher optical loss materials.

The polymers have to be cured at high temperatures (350° C. for PEP polymer and 250° C. for EP polymer), which results in the formation of cured materials with high birefringence. In addition the curing at high temperature causes increases the chances of side reactions such as oxidation. These side reactions contribute to larger optical losses.

The process of this invention provided a simple approach for introducing crosslinkable fluorostyrene moieties as shown in Scheme 1 into the polymers with an adjustable concentration by a one-pot reaction. Comparing to the published techniques, this invention possesses following advantages for the process and materials:

(a) The product is obtained as a pure white polymer with a low PDI.
(b) The product is free of any crosslinked structures
(c) Polymers with higher molecular weight are possible (Mw~50,000 Da)
(d) The process is suitable for introducing FSt into polymer for crosslinking.
(e) The contents of FSt in the polymer are variable and can be as designed.
(f) The product is photo- and thermally-crosslinkable.
(g) Low or high curing temperatures could be employed (ambient temperature to 250° C.).
(h) The product has an idealized Tg (e.g., 140° C. before curing, 170° C. after curing for FPEK-FSt, and 163° C. before curing, 191° C. after curing for FPESO-FSt)
(i) The product has a low birefringence.
(j) A range of polymers can be prepared covering a wide range of refractive index.
(k) The product produces uniform films, with excellent reproducibility in their optical properties (see below).

Most of the published synthetic techniques involve using $K_2CO_3$ or other alkali carbonate to neutralize HF that is produced in the reaction, and thus $H_2O$ is produced from the reaction. It has to be removed from the solution in order to complete the reaction and to eliminate the side reactions such as hydrolysis caused by $H_2O$. Azeotropic distillation are a common used technique for this purpose in the preparation of fluorinated poly(arylene ethers). However, this technique can not sufficiently remove $H_2O$ from the reaction and thus severe reaction conditions (high temperature, long reaction time) have to be employed in order to yield a high conversion for high molecular weight polymers. This severe condition causes side reactions (hydrolysis, cleavage, cyclization, oxidation, etc.), and lead to polymers with lower MW, high PDI and colour. On the other hand, for the azeotropic distillation, non-polar solvent, benzene or toluene has to be introduce into the reaction, which will reduce the selectivity of the reaction on the para-position of bis(pentafluorophenyl) compounds, and results in higher content of branching and even crosslinking structures.

SUMMARY OF THE INVENTION

According to the invention there is provided a process for preparing a fluorinated poly(arylene ether) comprising the repeating unit:

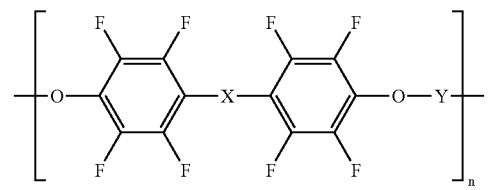

wherein n provides a molecular weight up to about 30,000 to 100,000, X represents one of following groups: none, ketone, sulfone, sulfide, ether, hexafluoroisopropylidene, αω-perfluoroalkylene, oxadiazole, and Y is 4,4'-(hexafluoroisopropylidene)-diphenyl, 4,4'-isopropylidene diphenyl, 3,3'-isopropylidene diphenyl, phenyl, or chlorinated phenol which process comprises reacting a bis(pentafluorophenyl) compound and a bisphenol or hydroquinone in the presence of a dehydrating agent and a polar aprotic solvent. By way of example the dehydrating agent may be selected from the group consisting of a molecular sieve, NaH, $CaH_2$, CaO, silica gel, activated $Al_2O_3$, $CaSO_4$, $MgSO_4$, and $Na_2SO_4$. In preferred embodiments the polar aprotic solvent is selected from the group consisting of dimethyl acetamide, dimethyl sulfoxide, N-methyl-2-pyrrolidone (NMP), dimethyl formamide and propylene carbonate.

The process of the invention may be carried out in the presence of an alkali metal salt such as a fluoride. Preferably the alkali metal salt is selected from the group consisting of KF, RbF, and CsF.

Alternatively the alkali metal salt may be a carbonate. For example the alkali metal carbonate may be selected from the group consisting of $Na_2CO_3$, $K_2CO_3$, $Rb_2CO_3$ and $Cs_2CO_3$.

The process of the invention may be mediated by $CaH_2$ or CaO and in the presence of such a catalytic amount of an alkali metal salt such as one of the fluoride salts referred to above in such a polar aprotic solvent.

Under certain circumstances it may be useful to carry out the process of the invention in the presence of a reflux-temperature-reducing co-solvent. Preferably the co-solvent is selected from the group consisting of toluene, benzene and tetrahydrofuran.

The process of the invention may be carried out in such a manner that the dehydrating agent is contained in a thimble between a reaction flask and a condenser so that condensed solvent from refluxing passes through the dehydrating reagent. The invention also relates to a process for preparing a tetrafluorostyrene comprising a polymer or oligomer of the formula:

a. Crosslinkable polymers with FSt groups end-capped

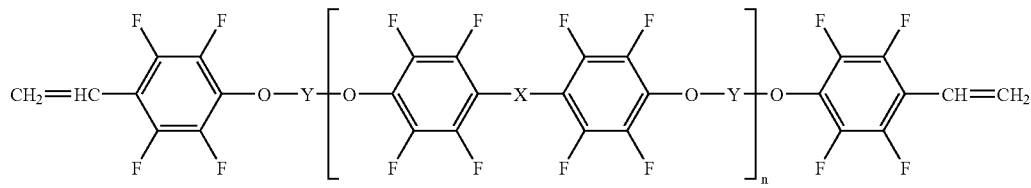

b. Oligomers

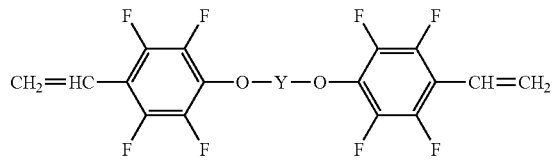

in which n provides a molecular weight up to about 30,000 to 100,000, X represents one of following groups: none, ketone, sulfone, sulfide, ether, hexafluoroisopropylidene, αω-perfluoroalkylene, oxadiazole, and Y is 4,4'-(hexafluoroisopropylidene)-diphenyl, 4,4'-isopropylidene diphenyl, 3,3'-isopropylidene diphenyl or —$CH_2(CF_2)_{2-12}CH_2$— which process comprises reacting pentafluorostyrene with bisphenol and then with a bis(pentafluorophenyl) compound in the presence of a dehydrating agent and a polar aprotic solvent. Such a process can be carried out as a one-pot reaction.

The invention additionally relates to a process for preparing a fluoropolymer comprising fluorostyrene residues as end-caps or as pendant groups of the formula

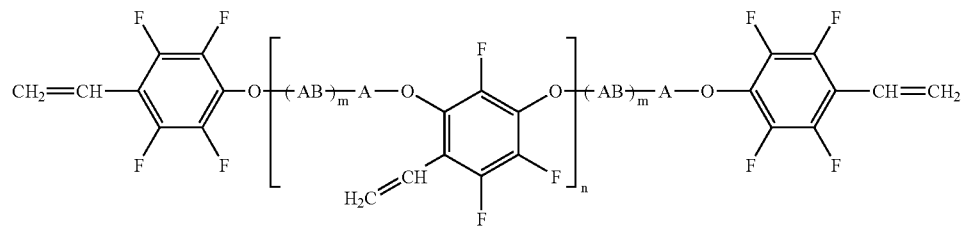

A = Y

B = 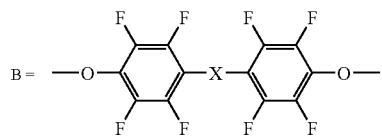

-continued wherein n, X and Y are as defined above and m is from 1 to 20 which process comprises polymerizing a compound of the formula 1 or 2

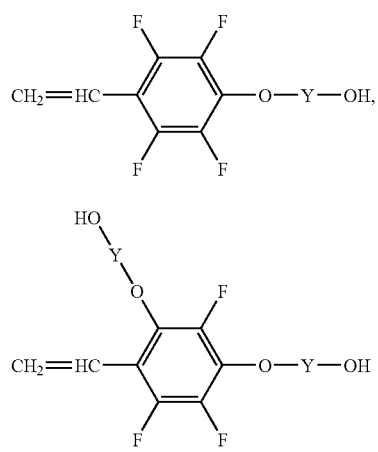

with a bis(pentafluorophenyl) compound as a one-pot reaction in the presence of a dehydrating agent and a polar aprotic solvent. Compounds 1 and 2 may be present in a predefined ratio.

The invention also concerns a crosslinkable highly fluorinated oligomer, a poly(arylene ether) or a poly(alkylene arylene ether) with fluorostyrene residues as end-cap groups or pendant groups in the oligomer or polymer, said oligomer or polymer having the formula:

a. Oligomers

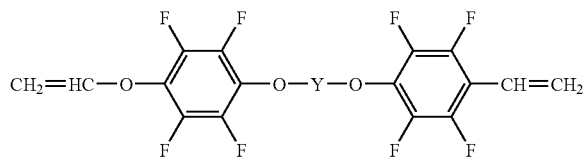

b. Crosslinkable Polymers with FSt Groups End-Capped

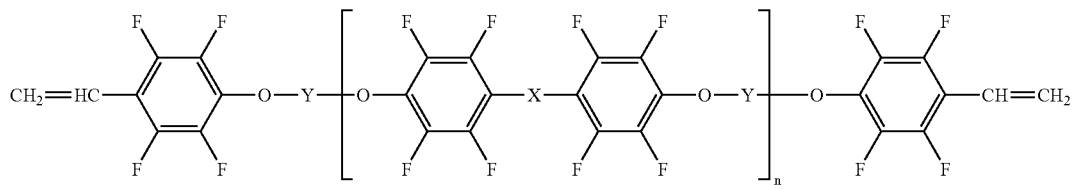

c. Crosslinkable Polymers with FSt End-Capped and Pendant Groups

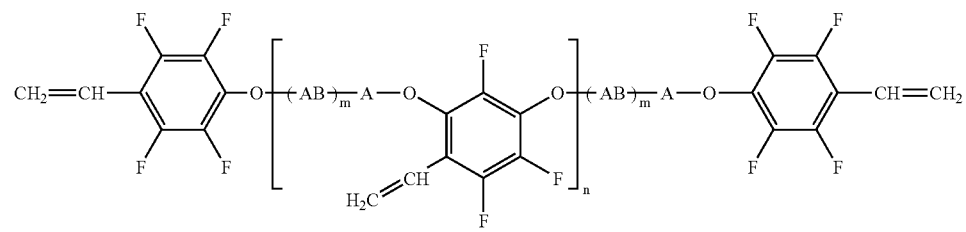

A = Y

B = 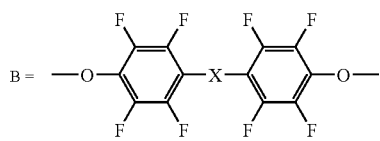

wherein n and m are as defined above and

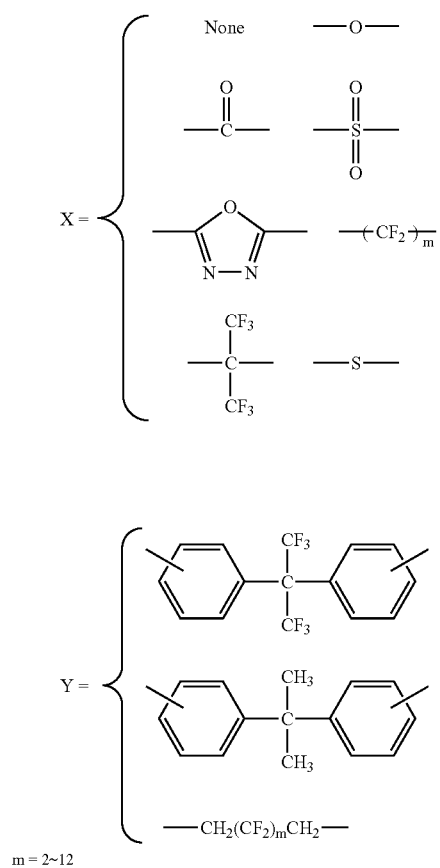

m = 2~12

Additionally the invention concerns a highly fluorinated poly(arylene ether oxidazole) comprising repeating units of the formula:

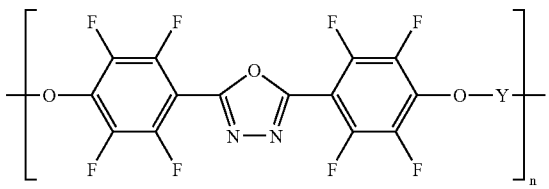

wherein n and Y are as defined above.

In Method 1 we disclose the use of molecular sieves or CaH$_2$ as dehydrating agents for the sufficient removal of H$_2$O from the reaction. This technique greatly promoted the reaction and allowed the reaction be conducted at milder reaction conditions and as a result it enhanced the selectivity of the reaction for the formation of linear polymer structure. This technique make it possible to prepare linear polymers from highly activated monomers such as the bispentafluorophenyl-compounds with the linkage group X as sulfone and oxadiazole.

However, in this technique, the reaction has to be conducted with refluxing in order to delivering water into vapour phase so that the water can be removed by the absorption of molecular sieves or calcium hydride. In this case, a low boiling point solvent such as tetrahydrofuran can be used to bring the refluxing temperature down for good control of the reaction. However, this kind of solvent is usually of lower polarity then commonly used solvents such as DMAc for polycondensation. This results in a poor selectivity of the reaction and less reactivity of monomers and thus reduces the reaction performance, i.e. producing polymers with a certain amount of branching structures. Such branching structures are detrimental for optical applications. Further improvements to overcome these shortcomings have been made.

The improvement in Method 2 is based on introducing CaH$_2$ or CaO into the reaction solution itself so that the by-product of the reaction, HF could be immediately and efficiently removed without producing H$_2$O. This modification significantly pushes the reaction equilibrium to the product side. Thereby the reaction is effected in extremely mild reaction conditions, which efficiently prevented the side reactions including branching, crosslinking, hydrolysis, and oxidation. Additionally, CaH$_2$ or CaO acts as a mediator to the reaction by forming a CaF$_2$ precipitate thereby reducing the concentration of fluorine ion in the solution. Fluoride ion was proved to catalyse side reactions such as chain cleavage. Therefore this method by use of CaH$_2$ combined with a catalytic amount of K$^+$, Rb$^+$, or Cs$^+$ in the solution offers a much simpler and more efficient way for the preparation of fluorinated polymers. Due to the better selectivity of the reaction to the para-fluorines in the bis(pentafluorophenyl)-compounds, polymers with linear structure, higher molecular weight (up to 100,000 Da) and free of any crosslinked microgels have been obtained.

This invention also proved that a solvent with higher polarity such as propylene carbonate (PC, comparing to DMAc)) give better selectivity for preparing fluorinated polymers, and thereby offer polymers with higher MW and lower PDI.

A very important contribution of this invention is that this process can easily introduce crosslinking groups, such as fluorostyrene moieties, into the polymers with an adjustable concentration in the manner as shown in Scheme 1 to offer the polymer a crosslinking capability. The obtained polymers can be thermally- or photo-cured at different temperatures (25–250° C.) with or without initiators to form high quality waveguide structures.

Therefore, a series of fluorinated polyethers and polyether oligomers has been prepared. Most of them are easily dissolved in most common solvent such as THF, cyclohexanone, DMF etc. Also, they are miscible each other. These materials can span a wide range of refractive indices. High quality uniform films for waveguide application have been prepared by spin-coating the solution of the crosslinkable polymer or the mixture of the polymers and/or oligomers followed by thermal or UV crosslinking. The refractive index of the polymer film is adjustable in a range of 1.46 to 1.54 by varying the relative amount of polymers and oligomers with different refractive index in the mixture.

BRIEF DESCRIPTION OF THE DRAWINGS

This reaction produces three products at different levels: mono-, di-, and tri-substitution of FSt. The mono substitution is demanded for the polymer with FST end-capped, a mixture of mono- and di-substitution are required for the preparation of high FSt contented polymers with FSt as both end-capped and pendant groups. However, tri-substituted products are harmful as they cause branching and even crosslinking structure. FIG. 7 shows 30~40 min is a proper reaction time for the FSt end-capped polymers for this step reaction. At this time the molar ratio of mono-/di/tri-substitutions is 93:6:0, while 200~250 min is proper for the polymers with FSt as both end-capped and pendant group.

FIG. 8 displays $^{19}$F NMR spectra of FPESO. The peak at −63.8 ppm is attributed to CF$_3$ group, and other two major peak at −137.4 and −152.1 ppm are attributed to the ortho- and meta-fluorines respectively in the polymer chains. The aromatic region was enlarged, and the spectra at different reaction time was compared. The results indicate the end-group related peaks at −137.0, −144.0 and −154.9 ppm do not have notable intensity change after 6 hr reaction and mean no more chain propagation after this time. At this time the peak related to the possible side reactions (marked with *) is very weak. Even at extended reaction time (9 hr), the intensity of these peaks still less than that of end-group, indicating the structure related to the side reactions such as branching is less than 2 units per polymer chain. This result obviously confirmed that the CaH$_2$ mediated reaction sufficiently depressed the side reactions.

FIG. 9 showed the effect on the reaction kinetics of different CaO that contain different level of H$_2$O (w %, measured by TGA) as shown below

| Type of CaO | Free H$_2$O | H$_2$O as Ca(OH)$_2$ | CO$_2$ as CaCO$_3$ |
| --- | --- | --- | --- |
| Flame dried | 0.00% | 0.00% | 8.0% |
| Vacuum dried | 0.00% | 2.0% | 0.9% |
| As-received | 0.04% | 3.7% | 0.9% |

Figure 9:
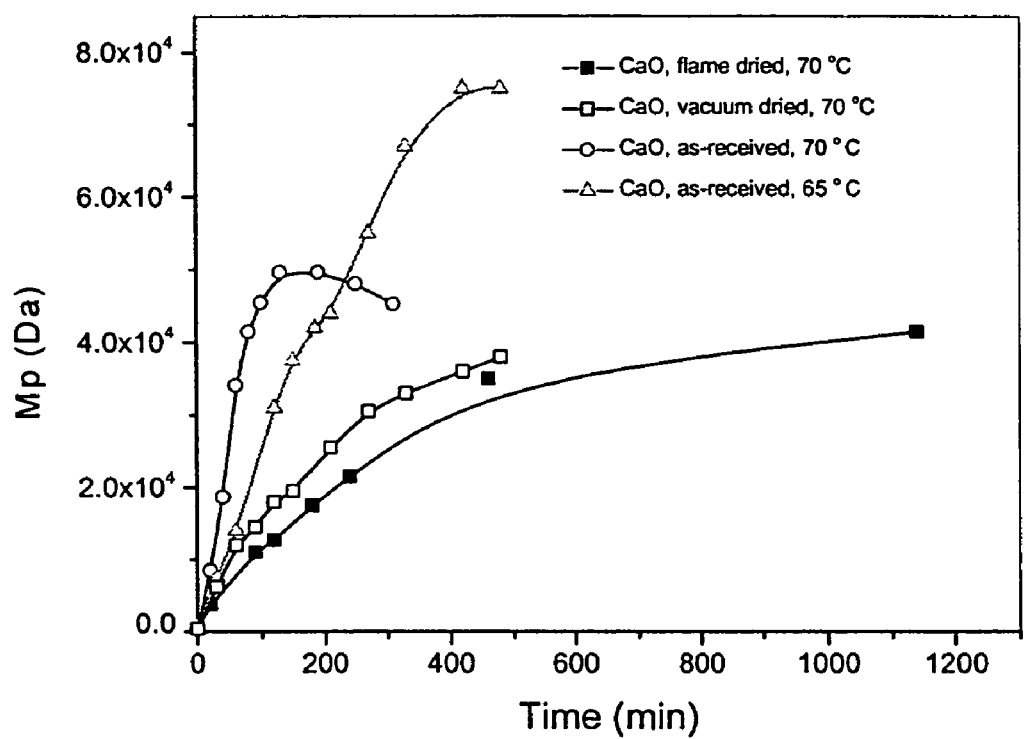
FIG. 9. Kinetics of the reaction for EPEK mediated by CaO and catalyzed by KF in DMAc. (H$_2$O effect). H$_2$O is proved to cause side reactions such as hydrolysis of ether linkages in this polymerization. This effect to the CaH$_2$ (or CaO) mediated reaction was verified by using CaO as mediator, in which water was allowed to introduce the reaction.

FIG. 9 shows that the reaction speed increased with the increase of the water content in the solution. Traces of water will efficiently promote the reaction rate. However, with the water content level as high as 0.2% of the solution, a molecular weight reducing at the end of polymerization was found, indicating side reactions to cause chain cleavage. However, this side reaction seems depressed when the reaction was conducted at lower temperature than shown in FIG. 9. in this case, high molecular weight polymers were obtained.

DETAILED DESCRIPTION OF THE INVENTION

Reaction Schemes:

1. The Preparation of Linear Polymers.

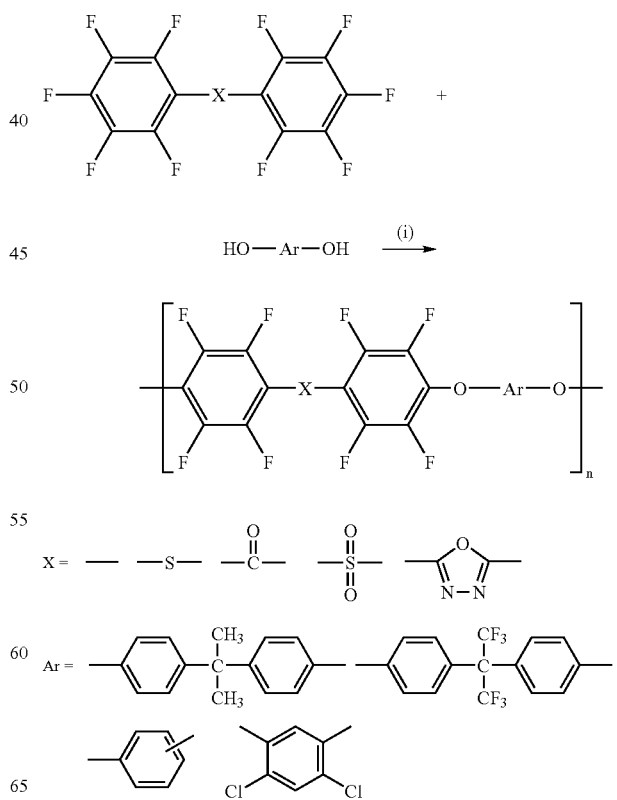

Condition: Method 1, for FPESO, CaH$_2$ in Vapour, K$_2$CO$_3$ in DMAc/THF (1/2, v/v) at 80° C., 100 min.
Method 2, for FPESO, KF+CaH$_2$ in PC, 70° C., 6 hr.

2. Fluorinated poly(arylene ether) with FSt End-Capper.

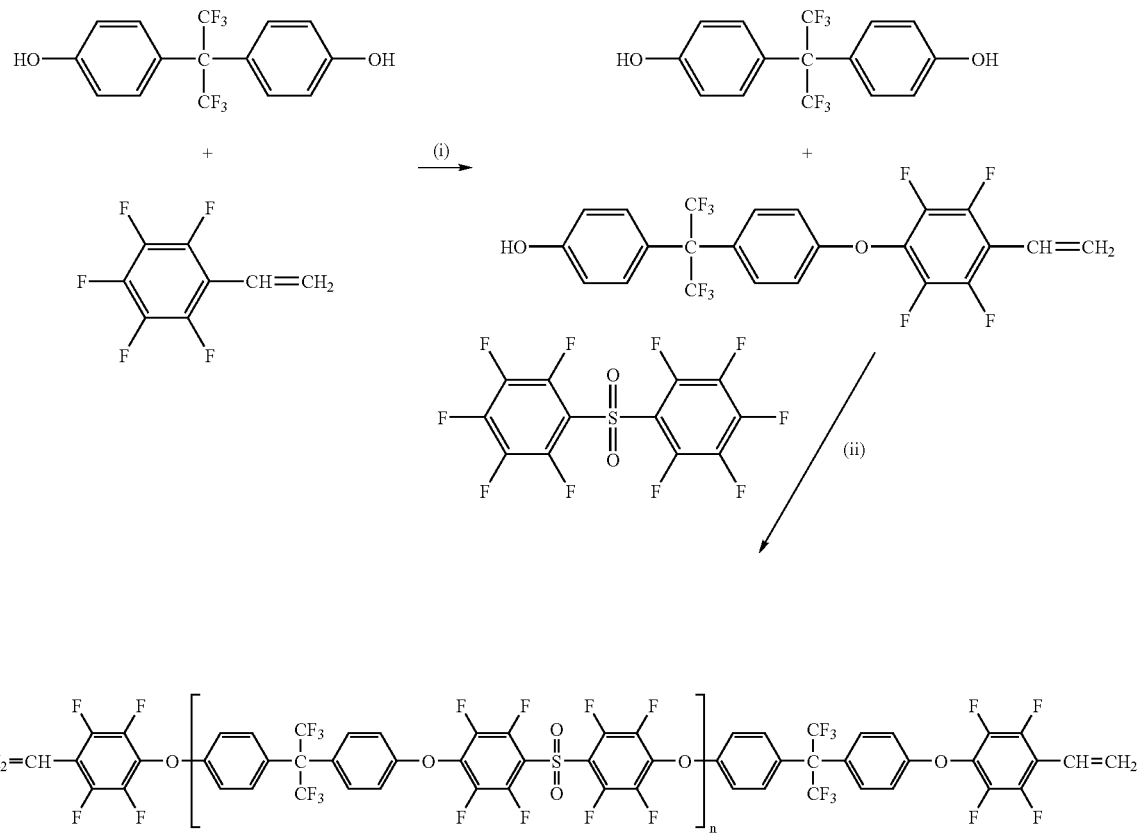

Condition:
Method 1. For FPEK, MS (in vapour)+K$_2$CO$_3$ in DMAc/Benzene (10/5,v/v) (i) 117° C., 40 min, (ii) 109° C., 20 min
Method 2. For FPEK, CaH$_2$+KF in DMAc (i) 120° C., 3 hr, (ii) 70° C., 3 hr.

For FPESO, CaH$_2$+KF in DMAc (i) 120° C., 3 hr, (ii) 70° C., 1.5 hr.

3. Fluorinated poly(arylene ether) with FSt as Chain Extender and End-Capper.

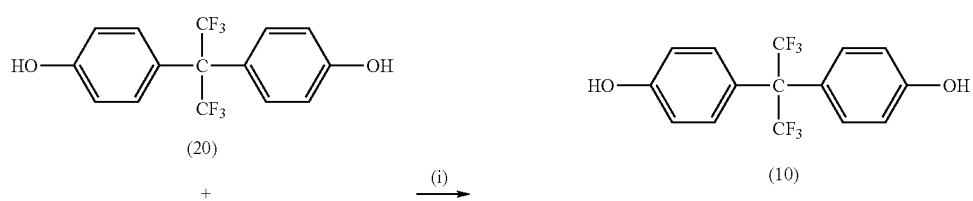

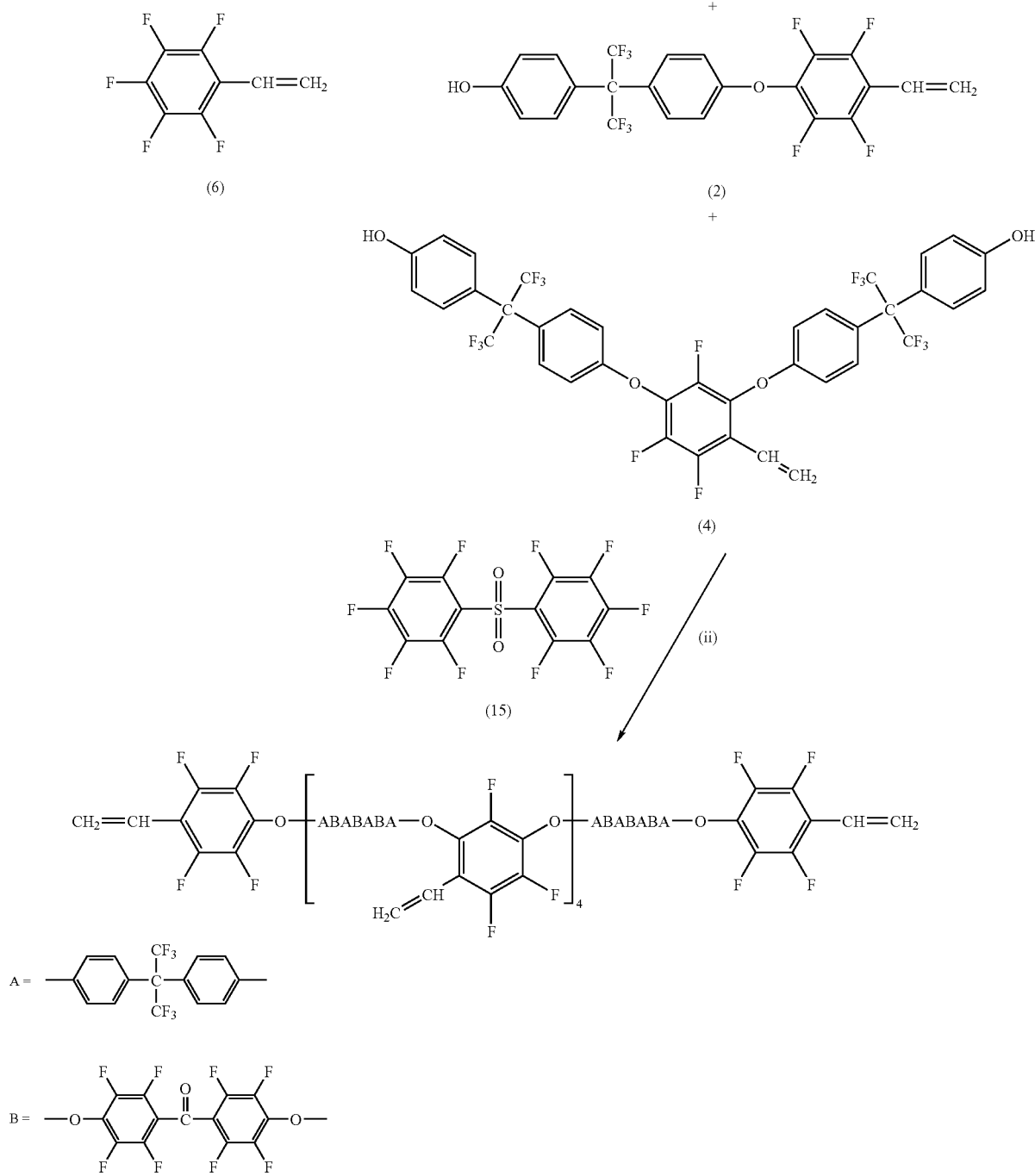

Method 1. For FPEK, MS (in vapour)+$K_2CO_3$ in DMAc/Benzene (10/5,v/v) (i) 117° C., 250 min, (ii) 106° C., 60 min Method 2. For FPESO, (i) MS (in vapour)+$K_2CO_3$ in DMAc/Benzene (10/5, v/v), 117° C., 250 min,
(ii) $CaH_2$+KF in DMAc, 70° C., 1.5 hr.

In the present invention, basically two reaction methods have been presented. In Method 1, common reaction condition is modified by employing dehydrating reagent in vapour phase to dry the condensed solvents from refluxing, so that he reaction was promoted and the selectivity for the formation of linear structure was enhanced. In Method 2, the polycondensation reaction have been modified by using a $CaH_2$ mediated technique, in which $CaH_2$ was added into the reaction solution incorporated with a catalyst amount of alkali metal ion such as $K^+$, $Rb^+$ and $Cs^+$. In this technique, $CaH_2$ acted as a base to neutralize the HF produced from the reaction. It also acted as a precipitator to remove $F^-$ by forming an insoluble $CaF_2$ precipitate. This modified reaction is especially useful for preparation of the highly fluorinated aromatic polyethers with electron withdrawing groups (such as ketone, sulfone or oxadiazole) as the linkage group X. These effects are clearly identified by the experimental results demonstrated in FIG. 1. The starting materials and the resultant polymers and oligomers are listed in Scheme 1.

Scheme 1. The Structures of Starting Materials and Resulted Polymers and Oligomers.

a. Starting Materials

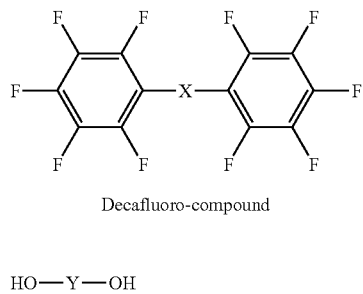

Decafluoro-compound

HO—Y—OH

Diois

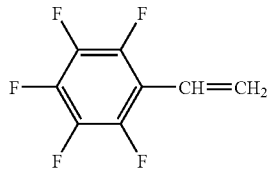

Petafluorostyrene b. Linear Polymers

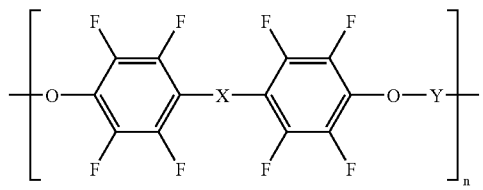

c. Crosslinkable Polymers with FSt Groups End-Capped

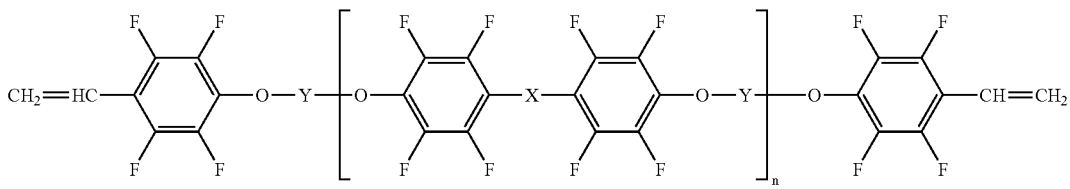

d. Crosslinkable Polymers with FSt End-Capped and Pendant Groups

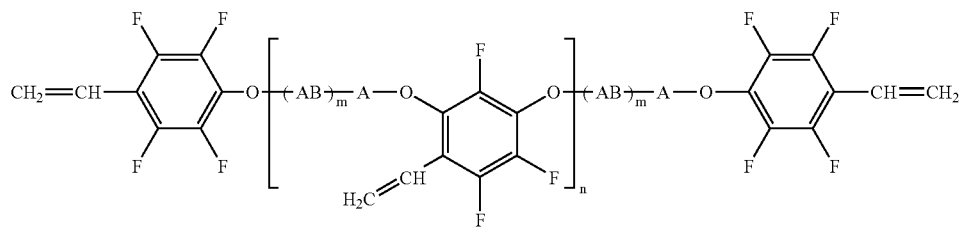

A = Y

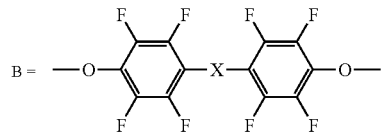

e. Oligomers

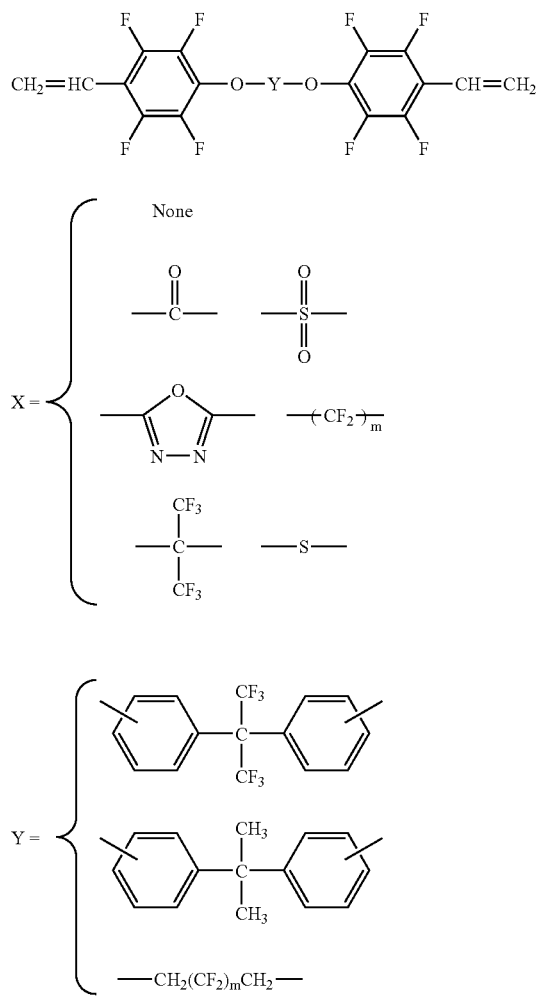

m = 2~12

Method 1. Polymerization by Dehydrating the Condensed Solvent.

A novel reaction device is provided by equipping a dehydrating thimble underneath the condenser in the reaction system, which was filled with anhydrous molecular sieves or $CaH_2$, so that the condensed solvent will pass through the dehydrating reagent. Comparing to the prior art devices e.g. a Soxhlet extractor, the novel device provides a smooth reaction with well-controlled reaction temperature and solvent composition during the reaction.

This device results in more efficient dehydration, so that the reaction can be done in milder conditions (lower temperature and short reaction time). As a result, the possibility of side reactions (hydrolysis, cyclization, oxidation, etc.) is reduced. This method is appropriate for preparing many fluorinated, and non-fluorinated aromatic polyethers.

Crosslinkable polymer containing fluorostyrene moieties have been prepared by this process for fluorinated poly (arylene ethers) and by a method using NaH for fluorinated poly(alkylene arylene ethers) as demonstrated in Scheme 2. The relevant oligomers have also been prepared in a similar manner without using the decafluoro-compound.

Figure 7:
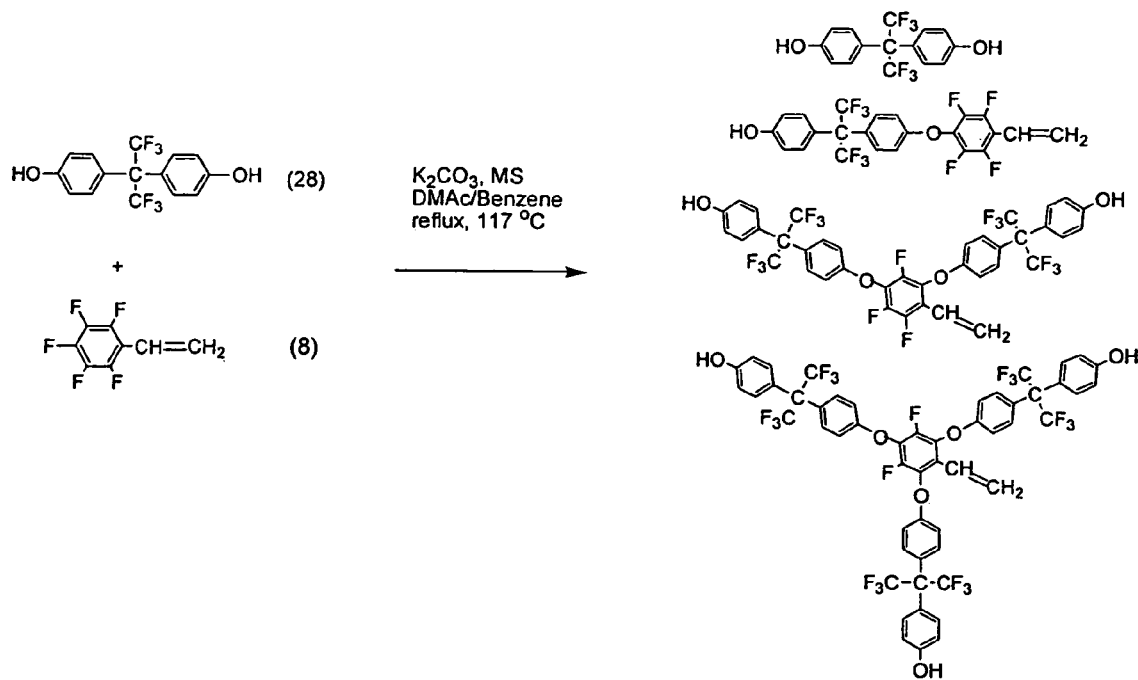
FIG. 7. Kinetics of the reaction between FSt and 6F-BPA.
Figure 7:
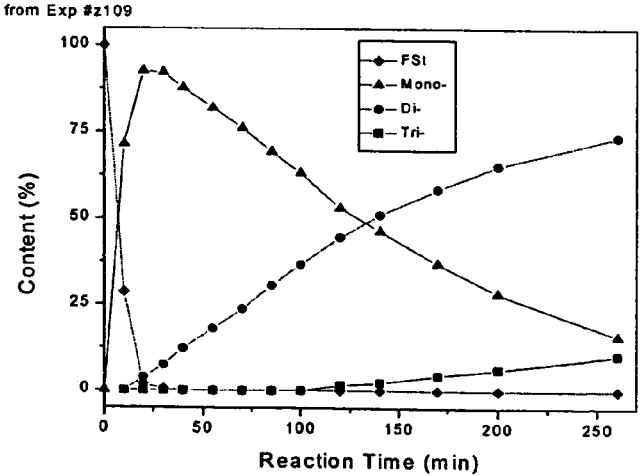

The reaction for preparing FSt containing fluorinated polyethers (including polyarylene ether, polyether ketone, polyether sulfone, and polyether sulfide) revealed that FSt is linked to the polymers in two different ways simultaneously. One is as end-capped groups and the other is as pendant groups. In the latter, FSt is actually inserted into the chain by forming two linkages at both the 2, and 4 positions of the benzene ring in styrene. The reaction condition for introducing the FSt at different level was described in FIG. 7. This enables us to prepare fluorinated polyethers with crosslinkable vinyl groups as side pendant groups as well as end-cappers. The loading density of FSt is adjustable. Due to the UV curability, these kinds of materials will be very useful in the waveguide fabrication by using direct patterning with UV lithograph techniques.

Scheme 2. Polycondensation Reactions for the Preparation of Fluorinated poly(arylene ether)s and Fluorinated poly (alkylene arylene ether)s with FSt End-Capped.

a. Fluorinated poly(arylene ether)

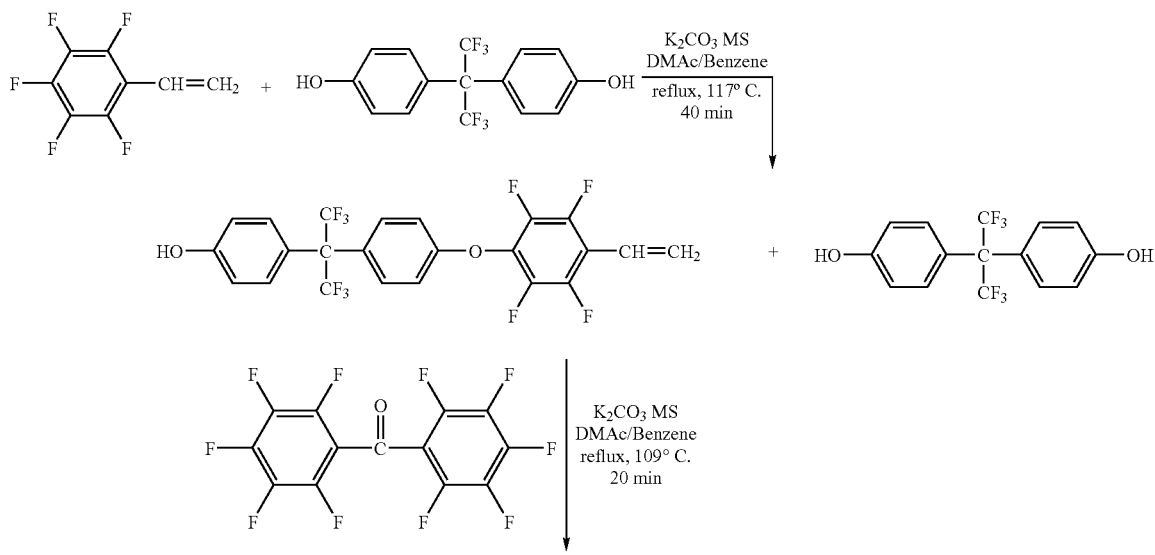

-continued
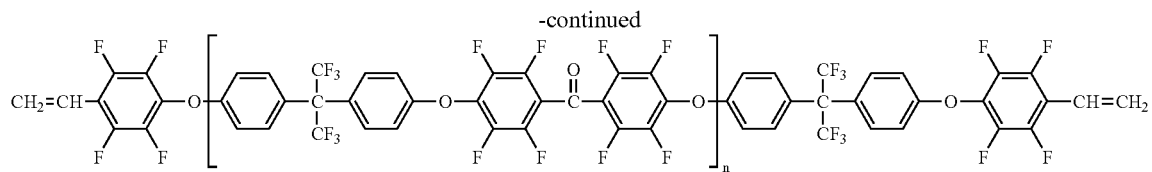
b. Fluorinated poly(alkylene arylene ether)
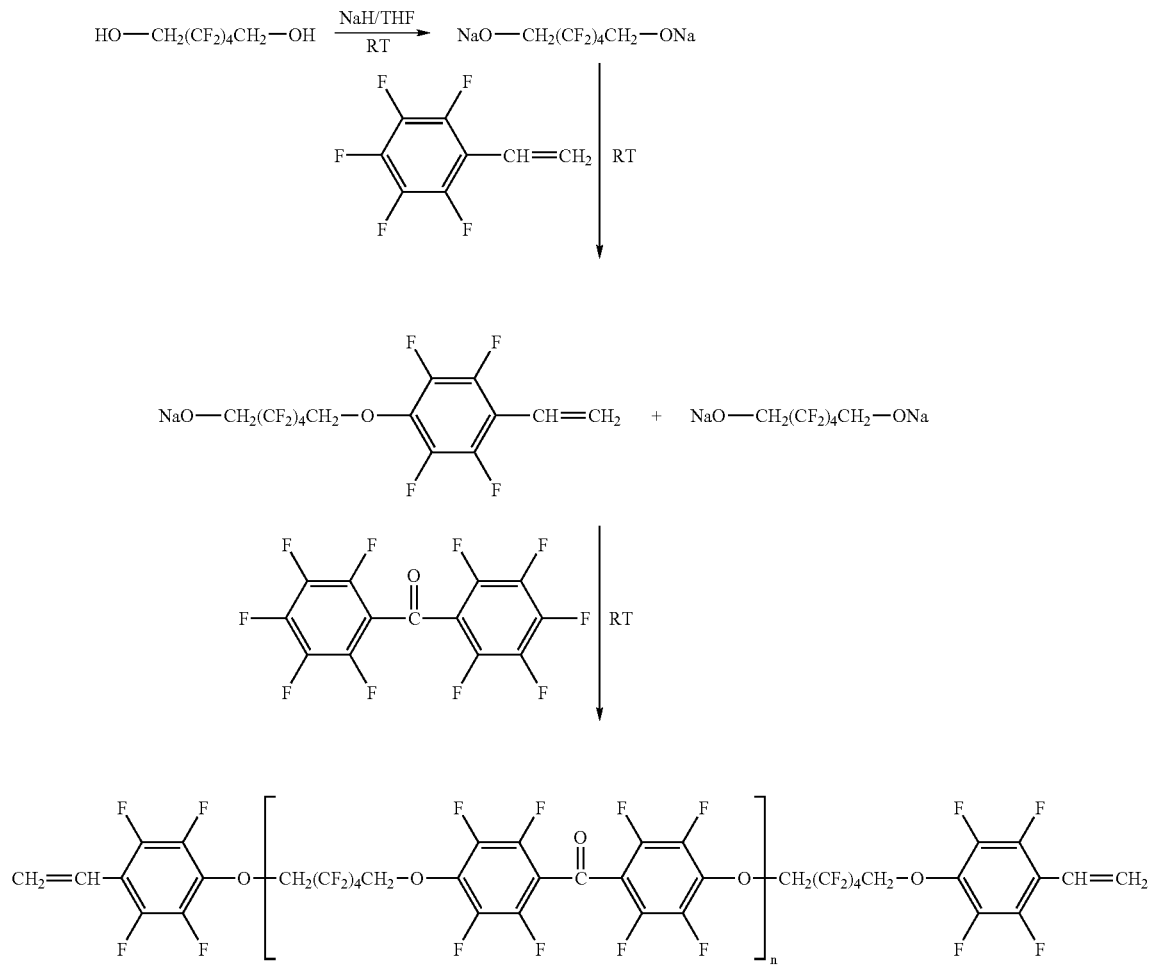
c. Fluorinated poly(arylene ethers) with High FSt Content
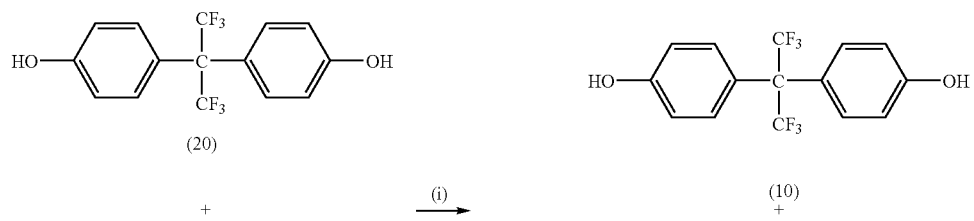

-continued

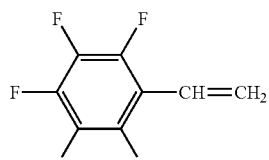
(6)

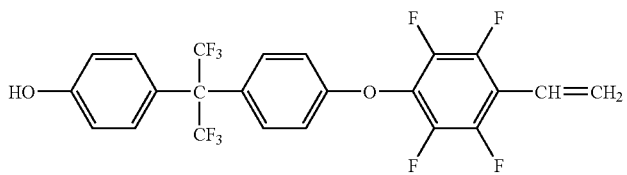
(2)

+

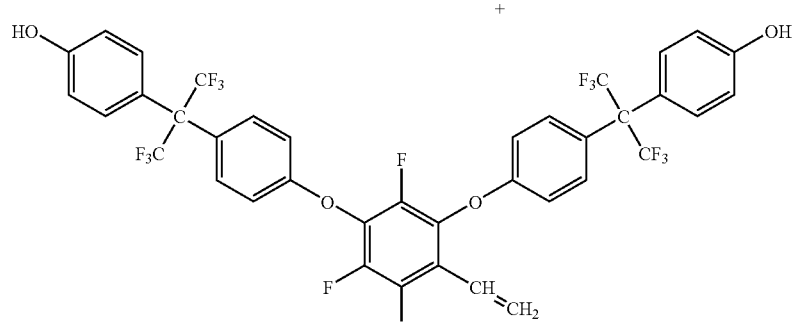
(4)

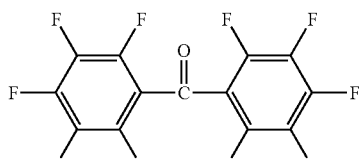
(15)

(ii)

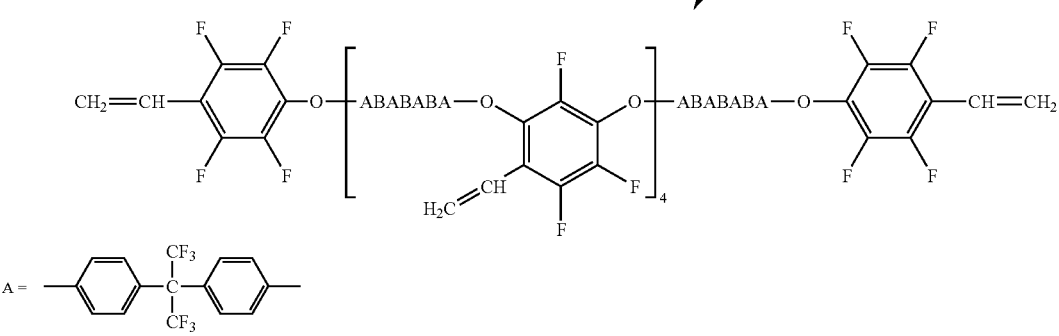

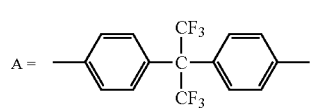

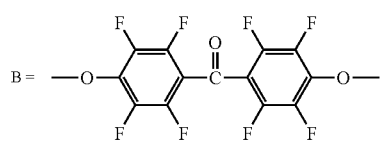

Condition: MS (in vapour)+$K_2CO_3$ in DMAc/Benzene (10/5,v/v) (i) reflux, 117° C., 150 min, (ii) reflux 106° C., 30 min.

The materials developed are useful as new passive optic polymer waveguide materials for telecommunication applications such as a thermo-optic switching, optical wavelength filters, beam splitters, optical connectors and arrayed waveguide gratings (AWG).

The different chemical structures of this series of fluorinated polyethers and polyether oligomers offer a wide range of materials with low optical loss and a wide range of refractive indices. High quality uniform films for waveguide application have been prepared by spin-coating the solution of the crosslinkable polymer or the mixture of the polymers and/or oligomers followed by thermal or UV crosslinking. The refractive index of the polymer film is adjustable in a range of 1.46 to 1.54 by varying the relative amount of polymers and oligomers with different refractive index in the mixture. The reproducibility of the optical properties of the crosslinked film from these materials is very high.

As an example, the crosslinked films produced from the polymer, FPEK-FSt and its blends with HBPAE-FSt are very uniform and have excellent reproducibility in terms of their optical properties. This reproducibility can be seen in Table 2, which gives examples of a set of measurements on refractive index and birefringence. The crosslinked films of FPEK-FSt on different silicon wafers showed highly reproducibility in terms of values for the refractive index and birefringence. The average deviation for the measured RI values is only 0.007%, which is at least 10 times better than the current applied techniques. Table 2. Refractive index and birefringence measurement of pentafluorostyrene endcapped fluorinated poly(ether ketone) (FPEK-FSt) after curing.

| Sample # | Thickness (μm) | $n_{TE}/n_{TM}$ | $\Delta n$ |
| --- | --- | --- | --- |
| 1 | 12.2800/12.3483 | 1.50194/1.49943 | $2.51 \times 10^{-3}$ |
| 2 | 10.3745/10.5027 | 1.50195/1.49933 | $2.62 \times 10^{-3}$ |
| 3 | 8.9083/9.0772 | 1.50195/1.49911 | $2.84 \times 10^{-3}$ |
| 4 | 7.2955/7.4976 | 1.50152/1.49901 | $2.51 \times 10^{-3}$ |

Method 2 Calcium Mediated Polycondensation Reactions.

The presently known synthetic techniques involve using $K_2CO_3$ or other alkali metal carbonate to neutralize HF that is produced in the reaction, and thus $H_2O$ is produced from the reaction. The following means have been reported for removing $H_2O$ and pushing the reaction forward:

High temperature with inert gas blowing

Azeotropic distillation

Inorganic dehydrating reagents in vapour or in solution including, molecular sieves, silica gel, activated $Al_2O_3$, $CaSO_4$, $MgSO_4$, and $Na_2SO_4$.

Another known technique involves turning phenol to phenoxide alkali metal salt first, and then reacting with halide.

The various known processes suffer from the following limitations or drawbacks.

Severe reaction conditions (strong causticity, high temperature, long reaction time) have to be used. They cause side reactions (hydrolysis, cleavage, cyclization, oxidation, etc.), and lead to polymers with lower MW, high PDI and colour.

The severe reaction conditions also cause branching and crosslinking gel formation when activated decafluorodiphenyl-compound such as decafluorobenzophenone, bis(pentafluorophenyl) sulfone was used for preparing fluorinated polymers.

In Method 1 we disclosed the use of molecular sieves or $CaH_2$ as dehydrating agents to remove water produced from the following reaction. This technique greatly promoted the reaction and allowed the reaction be conducted at milder reaction conditions and as a result it enhanced the selectivity of the reaction for the formation of linear polymer structure and reduced the side reactions. This technique also make it possible in first time to prepare linear polymers from highly activated monomers such as the bispentafluoro-compounds with the linkage group X as sulfone and oxadiazole groups.

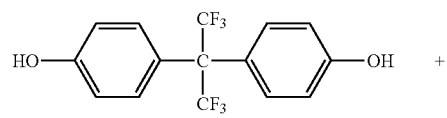

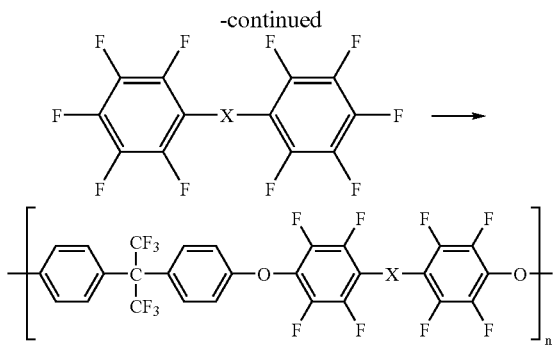

However, in this technique, a refluxing solvent system has to be used and the reaction has to be conducted at reflux temperature in order to delivering water into vapour phase so that the water can be removed by absorption by molecular sieves or calcium hydride. In this case, a low boiling point solvent such as tetrahydrofuran preferably is used to bring the refluxing temperature down for good control of the reaction. However, this gentle solvent usually has a lower polarity then commonly used solvents such as DMAc for polycondensation. This could result in a poor selectivity of the reaction and less reactivity of monomers and reduce the reaction performance, i.e. producing polymers with higher content of branching structure. Such branching structures are detrimental for optical applications. We have now developed further improvements (Method 2) to overcome these shortcomings.

This improvement is based on introducing $CaH_2$ into the reaction solution so that the by-product, HF can be immediately and efficiently removed. This modification significantly pushes the reaction equilibrium of polycondensation to the product side. Thereby the reaction is effected in extremely mild reaction conditions, which efficiently prevented the side reactions including crosslinking, hydrolysis, cyclization, and oxidation. Therefore, this method by use of $CaH_2$ combined with a catalytic amount of $K^+$, $Rb^+$, or $Cs^+$ in the solution offers a much simple and efficient way for the preparation of fluorinated polymers. Due to the better selectivity of the reaction to the para-fluorines in the decafluorodiphenyl-compounds, polymers with linear structures free of any crosslinked gel particles have been obtained.

$CaH_2$ in solution acts as a base to neutralize the acid, and as a precipitating reagent to remove $F^-$, both effects promoting the reaction, and reducing the tendency of side reaction. $F^-$, if present in the solution, acts as a strong catalyst for the side reaction such as the cleavage of the ether chain. The use of $CaH_2$ makes the reaction possible at very mild reaction conditions, and also makes it possible to prepare the following fluorinated polymers with the molecular weight up to 50,000 Da (Mn) with low MW distribution.

1. Fluorinated poly(arylene ether sulfone),
2. Fluorinated poly(arylene ether oxadiazole),
3. Fluorinated poly(arylene ether ketone),
4. Fluorinated poly(arylene ether sulfide),
5. Fluorostyrene containing polymers (any of above polymers).

Also a new solvent (propylene carbonate) was found to give better selectivity for preparing fluorinated polymers, and thereby offers polymers with higher MW.

Reaction Schemes (for Some Optimised Reaction Conditions):
1. The Preparation of Linear Polymers.
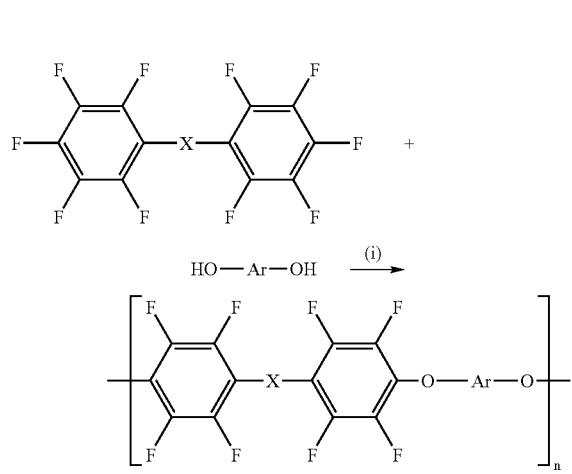
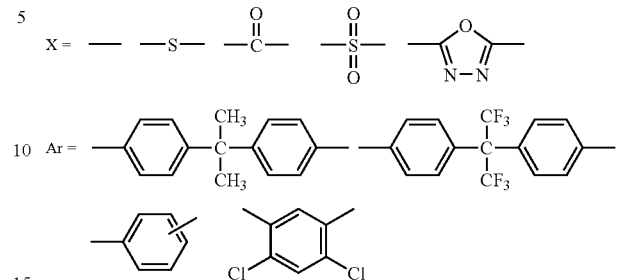
Condition: (i) KF (or RbF, CsF)+CaH$_2$ in aprotic polar solvent (e.g. for FPESO KF+CaH$_2$ in PC, 70° C., 6 hr).
2. Fluorinated poly(arylene ether) with FSt End-Capper.
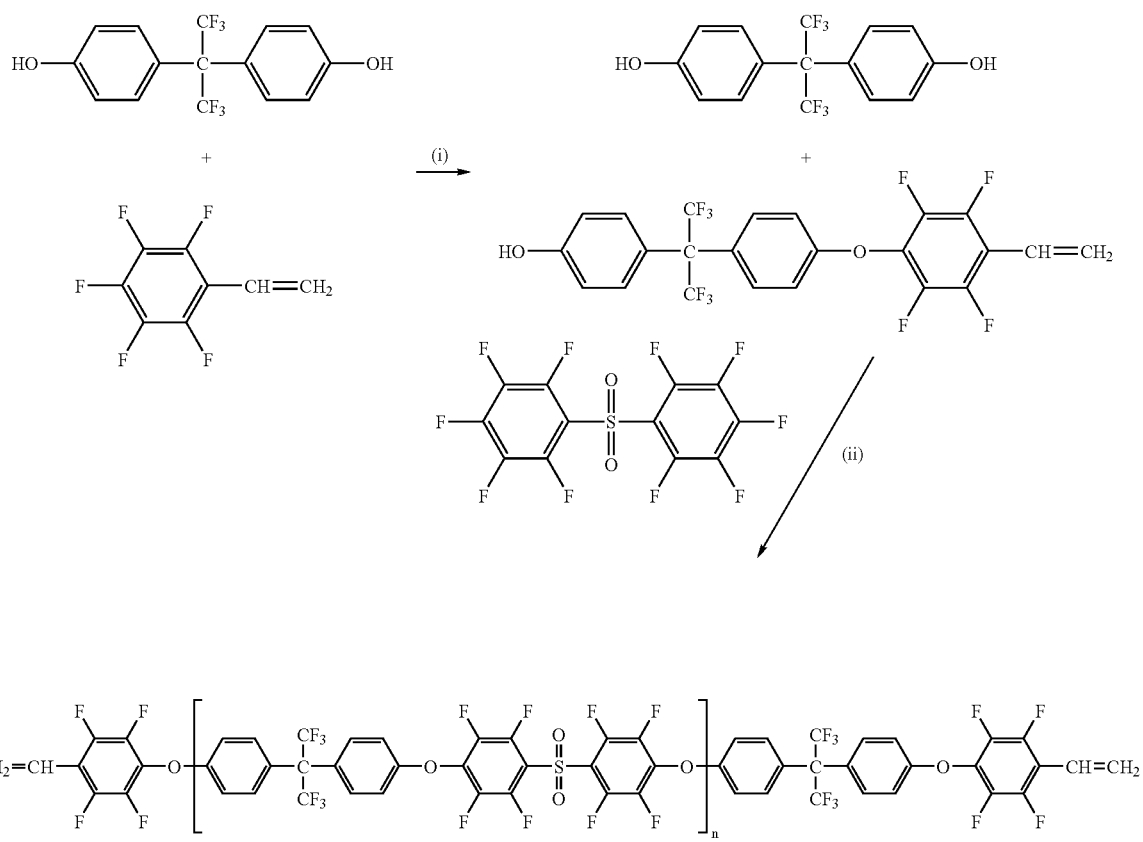
Condition: CaH$_2$+KF in DMAc (i) 120° C., 3 hr, (ii) 70° C., 1.5 hr.

3. Fluorinated poly(arylene ether) with FSt as Chain Extender and End-Capper.
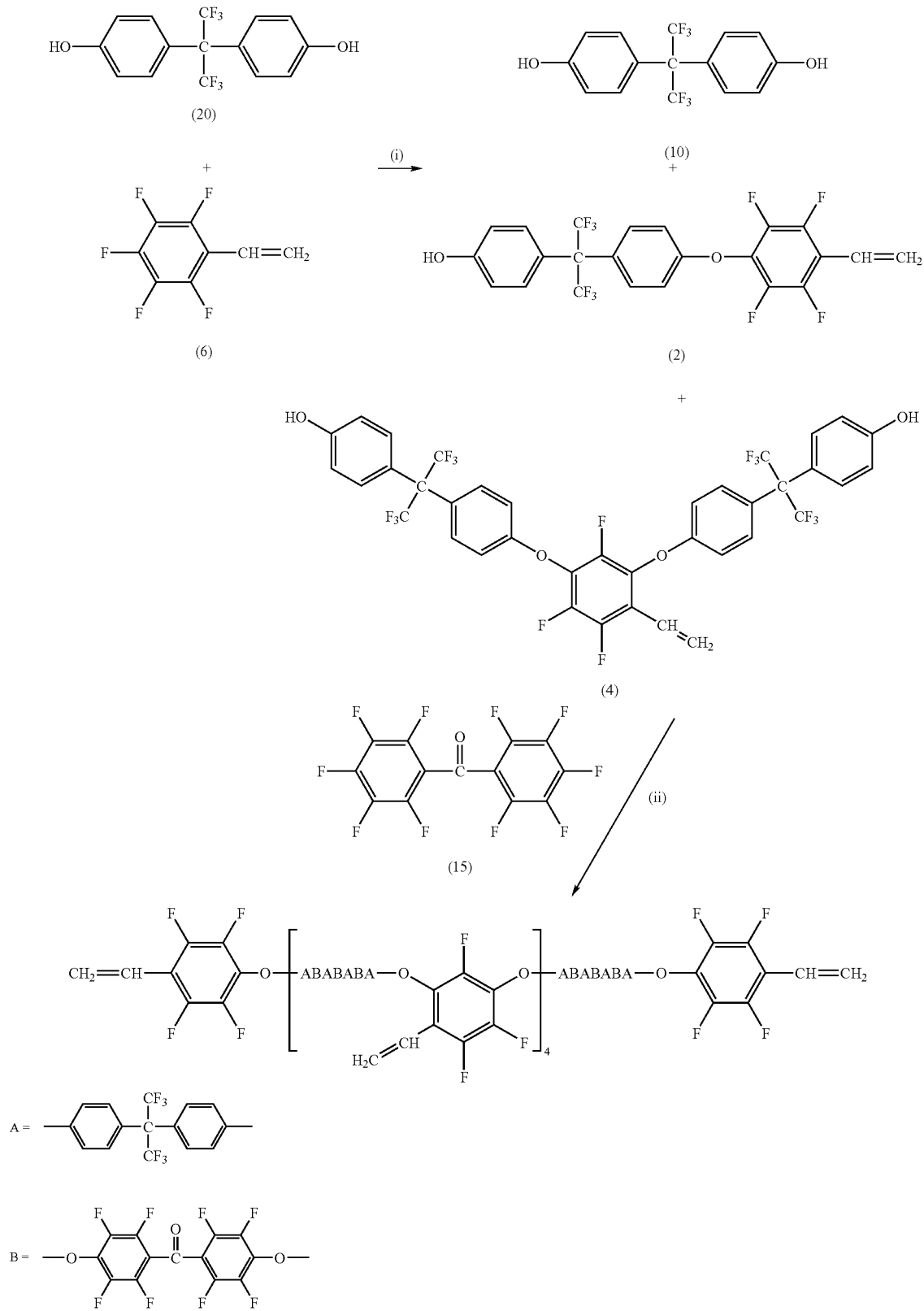

Condition: (i) CaH$_2$ (in vapour)+K$_2$CO$_3$ in DMAc/Benzene (10/5, v/v), 117° C., 250 min, (ii) CaH$_2$+KF in DMAc, 70° C., 1.5 hr.

In the present invention, the polycondensation reaction have been modified by using a CaH$_2$ mediated technique, in which CaH$_2$ was added into the reaction solution incorporated with a catalyst amount of alkali metal ion such as K$^+$, Rb$^+$ and Cs$^+$. In this technique, CaH$_2$ acted as a base to neutralize the HF produced from the reaction, and it also acted as a precipitator to remove F$^-$ by forming an insoluble CaF$_2$ precipitate. F$^-$ is proved to be detriment to the reaction by catalyze the side reactions such as hydrolyzing and cleaving the chain. Therefore this modified reaction is especially useful for preparation of the highly fluorinated aromatic polyethers with electron withdrawing groups (such as ketone, sulfone or oxadiazole) as the linkage group X. These effects are clearly identified by the experimental results demonstrated in FIG. 1

Figure 1:
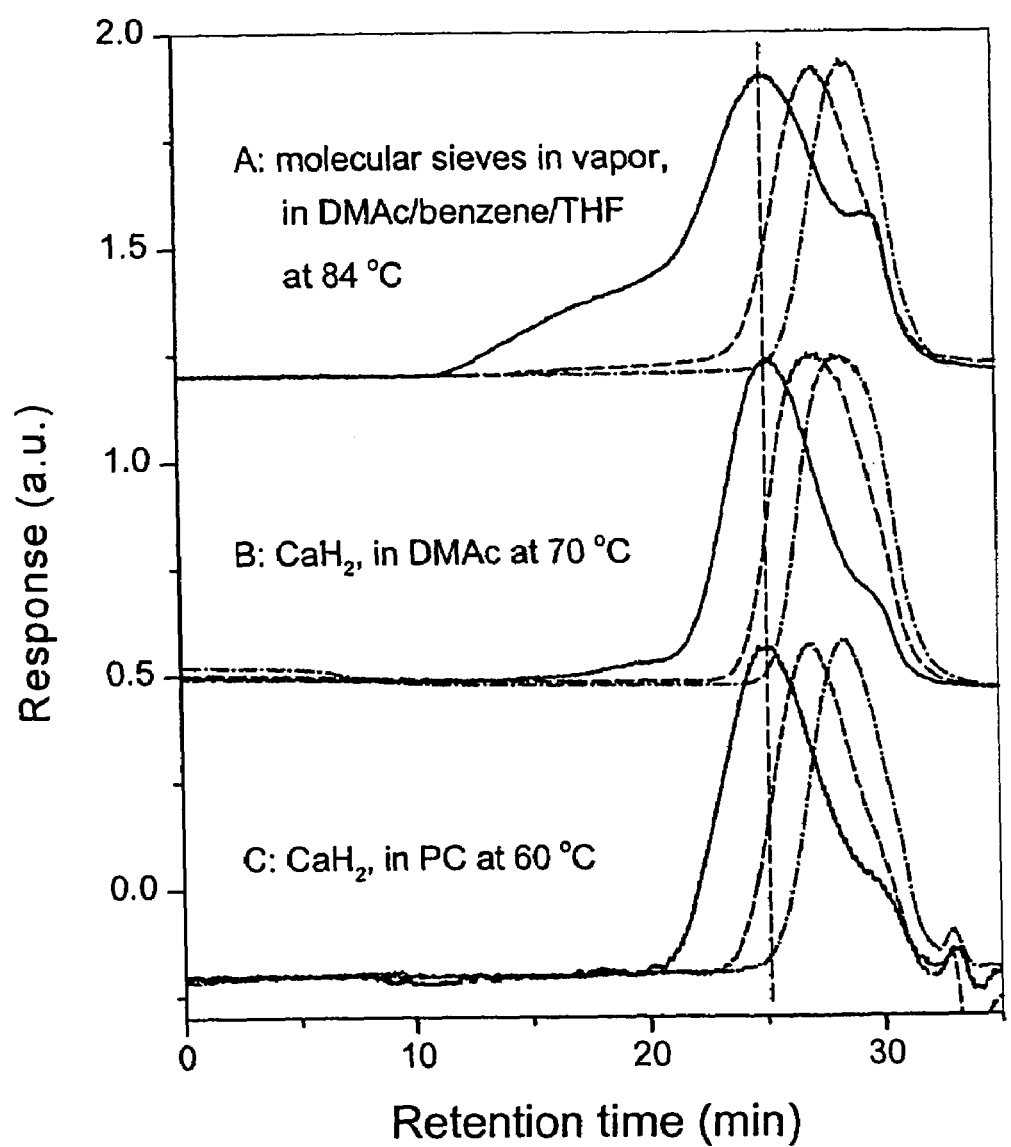
FIG. 1 shows GPC curves of fluorinated polyether sulfone at different times from the reaction techniques of: (A) molecular sieve dehydration in vapour phase, reacted at reflux (84° C.); (B) CaH$_2$ mediated, reacted in DMAc at 70° C.; (C) CaH$_2$ mediated, reacted in PC at 60° C.

For FIG. 1, the reactions of bis(pentafluorophenyl)sulfone (BPSO) with hexafluorobisphenol A (6F-BPA) were conducted with the molar ratio of 3.00/2.95, so that the theoretical molecular weight of the designed polymers is 41,600 Da. The molecular weight (Mn) of the final polymers from the reaction is around 21,000 Da, by considering some of cyclic oligomer contained in the polymers, these data are already very close to the theoretical value. It should be noted that a broad shouldered peak was found from the reaction with molecular sieves (FIG. 1A), this shouldered peak related to the formation of branched structures, while this peak was reduced to a small tail from the CaH$_2$ mediated reaction in DMAc (FIG. 1B). It was further reduced and completely disappeared when propylene carbonate (PC) was used as the solvent (FIG. 1C).

Figure 2:
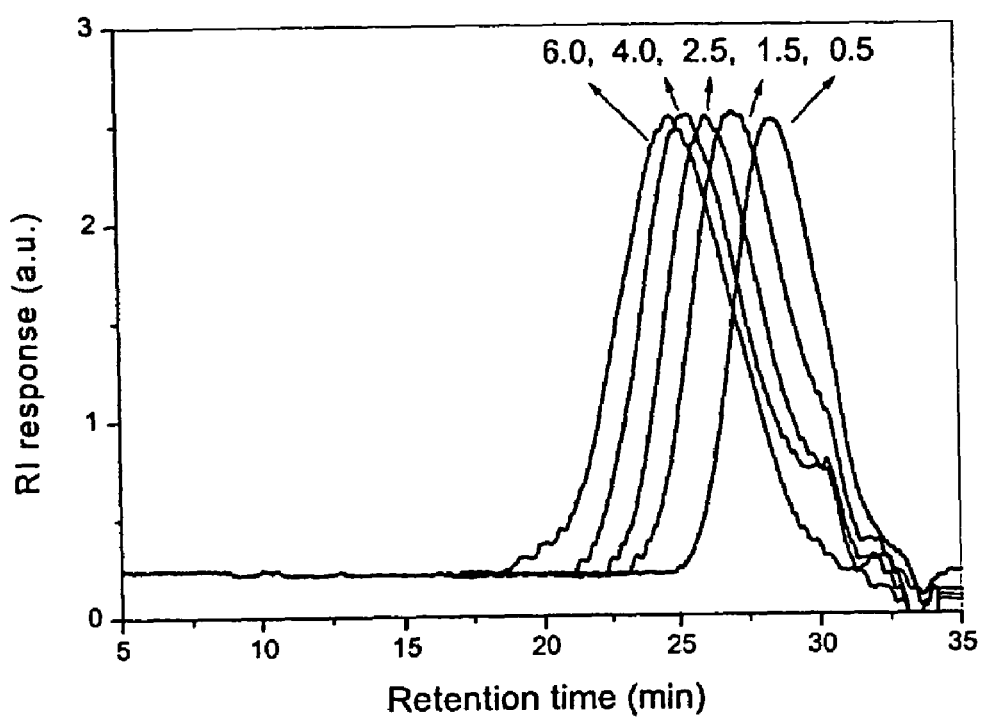
FIG. 2 shows GPC curves of fluorinated polyether ketone at different times from the CaH$_2$ mediated reaction. Reaction condition: Bis(pentafluorophenyl) ketone (BPK)/6F-BPA (3.00/2.95, molar ratio), in DMAc at 70° C. with 20% KF (molar ratio to bisphenol) for 0.5, 1.5, 2.5, 4.0, 6.0 hr.
Figure 3:
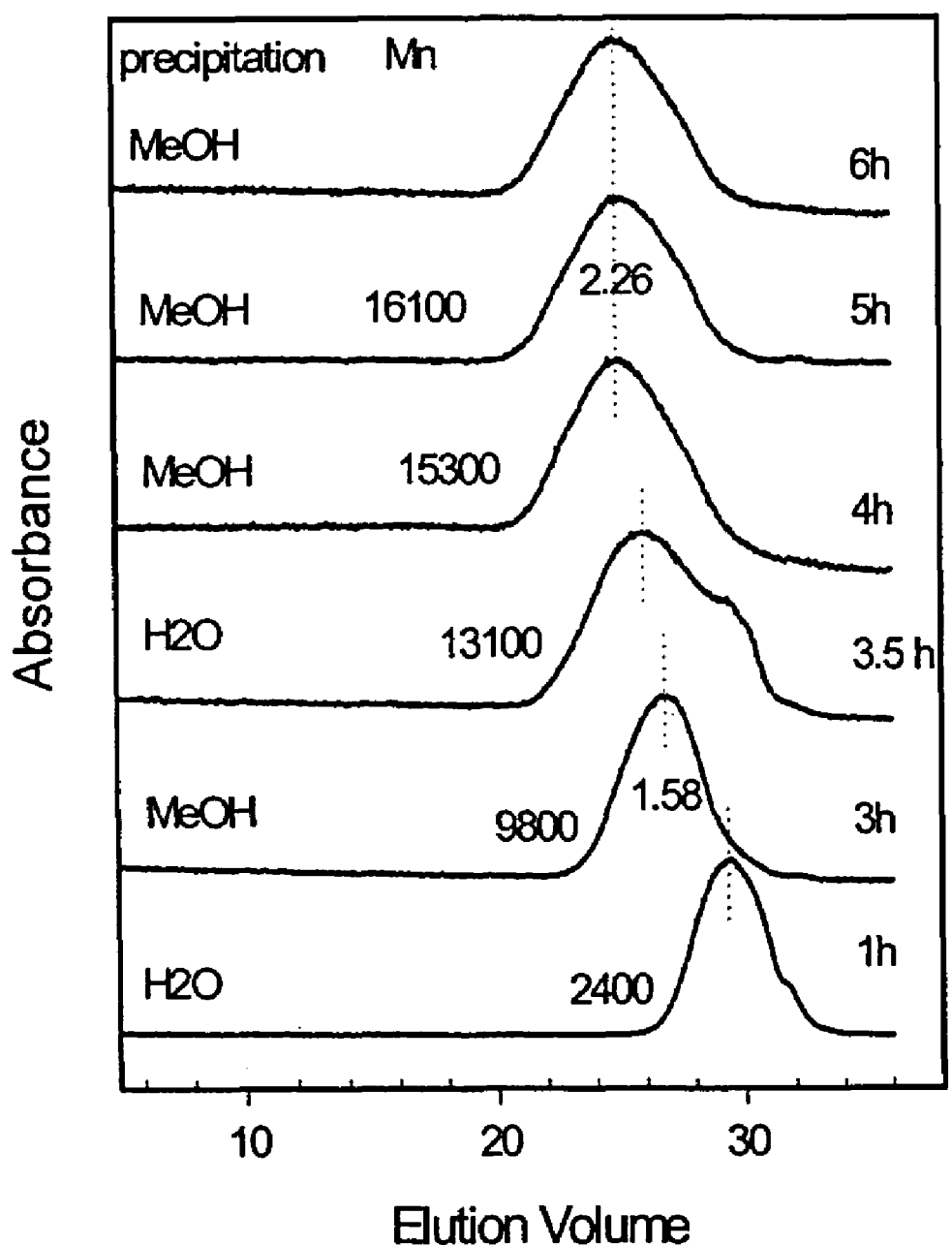
FIG. 3 shows GPC curves of fluorinated polyether oxadiazole at different times from the CaH$_2$ mediated reaction. Reaction condition: Bis(pentafluorophenyl) oxadiazole (BPOx)/6F-BPA (3.00/2.95, molar ratio), in PC at 64° C. with 20% KF (molar ratio to bisphenol) for 1, 3, 3.5, 4, 5, 6 hr. the sample was either washed with H$_2$O, or MeOH as indicated.

A similar feature was also found when fluorinated polyether ketone and polyether oxadiazole were prepared by using the CaH$_2$ mediated reaction in DMAc and PC respectively (see FIG. 2 and FIG. 3). For the preparation of polymers containing highly activating group such as fluorinated polyether sulfone and polyether oxadiazole, from the molecular sieves dehydrating reaction, the formation of low content of branched structure is unavoidable if high molecular weight materials are demanded. In contrast, CaH$_2$ mediated reactions significantly prevented the formation of the branched structure in as shown in FIGS. 1 to FIG. 3.

Kinetics of the Reaction.

1. Concentration of Catalyst:

The effect of the concentration of KF as catalyst on the reaction speed was tested. The results showed that the reaction speed increased with the concentration of KF in the reaction, and the rate leveled off when the amount of KF reached 10 mol % relative to the bisphenol. Therefore, 20 mol % of the KF was recommended for the reaction.

2. Alkali Metal Ion, M$^+$.

Figure 4:
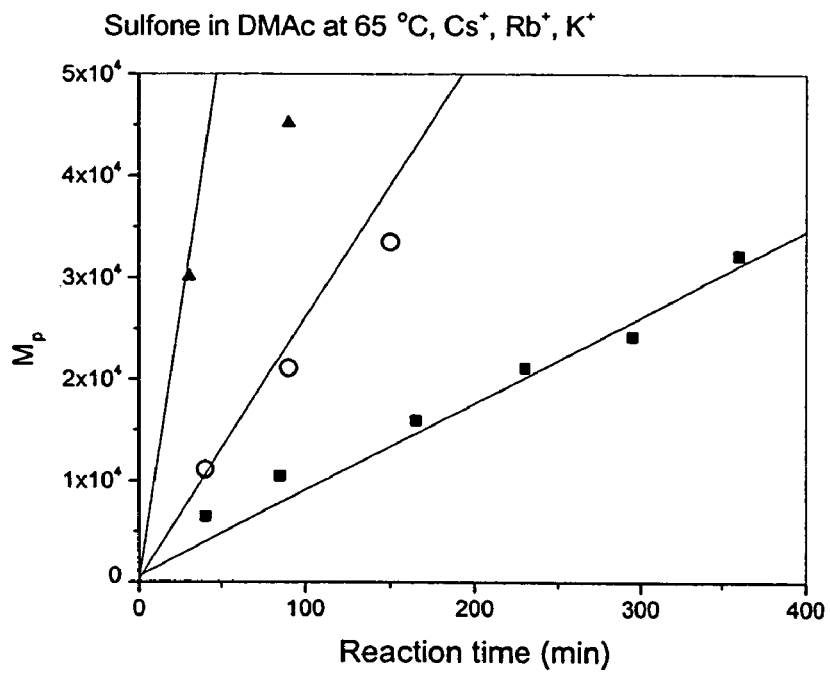
FIG. 4 shows alkali metal ion effect on the reaction speed for the preparation of fluorinated polyether sulfone (Cs$^+$(▲), Rb$^+$(○) and K$^+$(■) FIG. 4a) and polyether ketone (K$^+$ at 70° C.(○) and Cs$^+$ at 45° C.( ) FIG. 4b) in DMAc.
Figure 4:
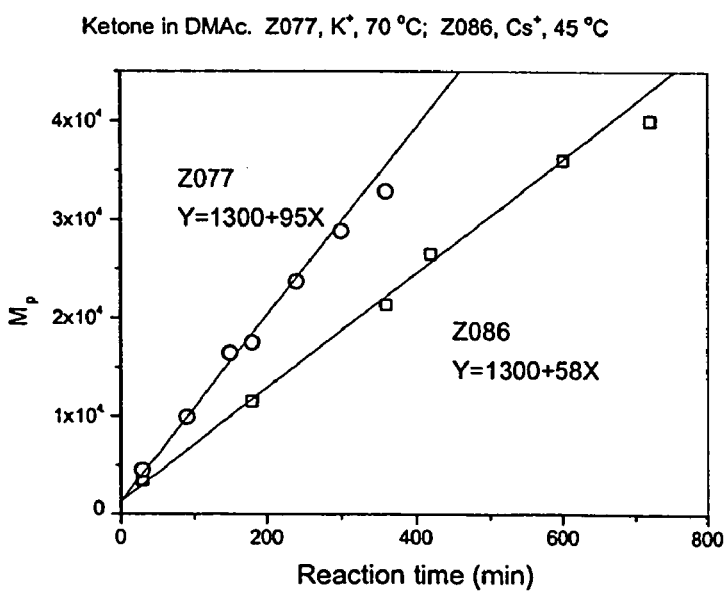

The reactivity of M$^+$ to this reaction increased in the following sequence Na$^+$<K$^+$<Rb$^+$<Cs$^+$. When NaF was used as catalyst, No polymer was found from the reaction. While, a significant reaction speed was found when KF was used as catalyst in DMAc. FIG. 4 shows that reaction with Cs$^+$ is about 10 times faster that that with K$^+$ for the preparation of polyether sulfone, and the reaction with Cs$^+$ at 45° C. possess a comparable speed as the reaction with K$^+$ at 70° C. for the preparation of polyether ketone.

3. Counter Ion Effect:

The effect of the counter ion other than F$^-$ such as Cl$^-$ has been tested for this reaction. It is found that the presence of any amount of Cl$^-$ will completely retard the reaction.

4. Temperature Effect of the Reaction in DMAc by Using CsF as Catalyst.

Figure 5:
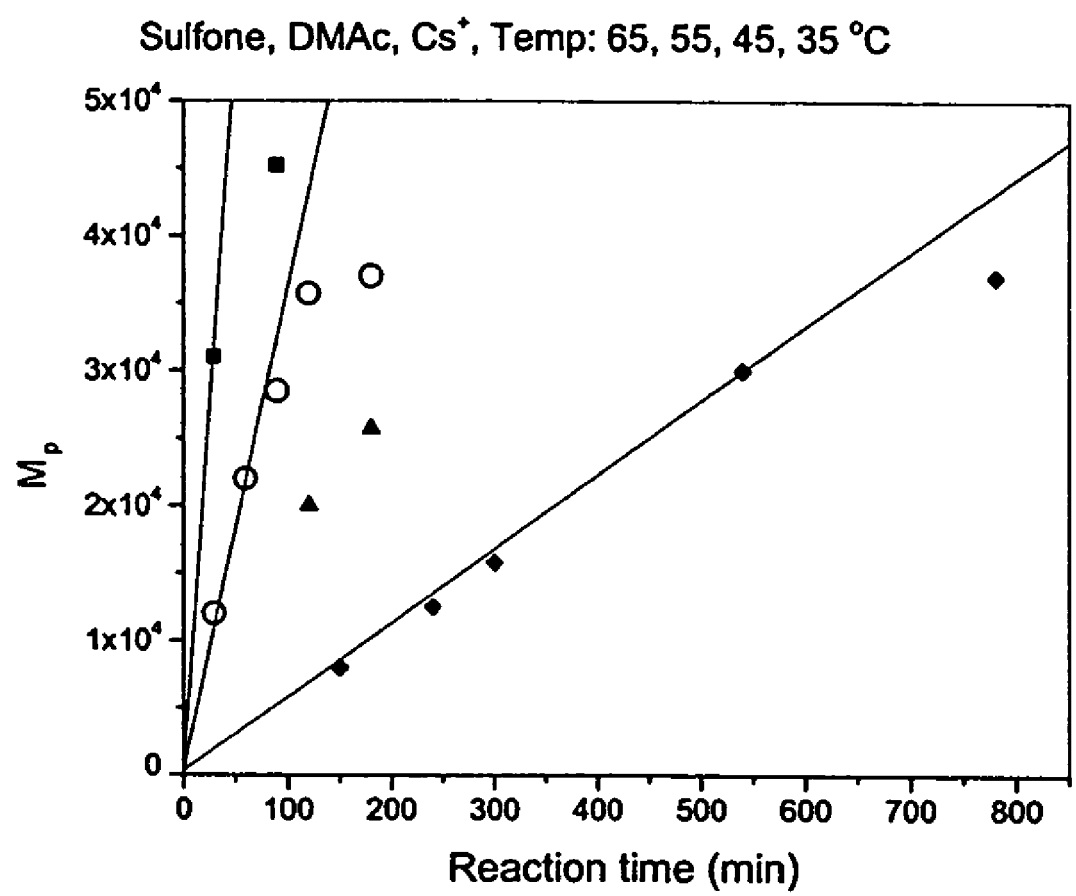
FIG. 5 shows the increase of molecular weight of polymer with the reaction time at temperatures of 35 (♦), 45 (▲), 55 (○) and 65 (■) ° C., when the reaction was conducted in DMAc in the present of 20% (molar ratio to phenol) CsF.

FIG. 5 shows the reaction speed increased with the temperature at a rate of 6 folds per 10 degree. While the molecular weight and molecular weight distribution did not show an obvious difference for different temperature, indicating there is no significant side reaction at the tested temperature between 35 to 65° C.

Figure 6:
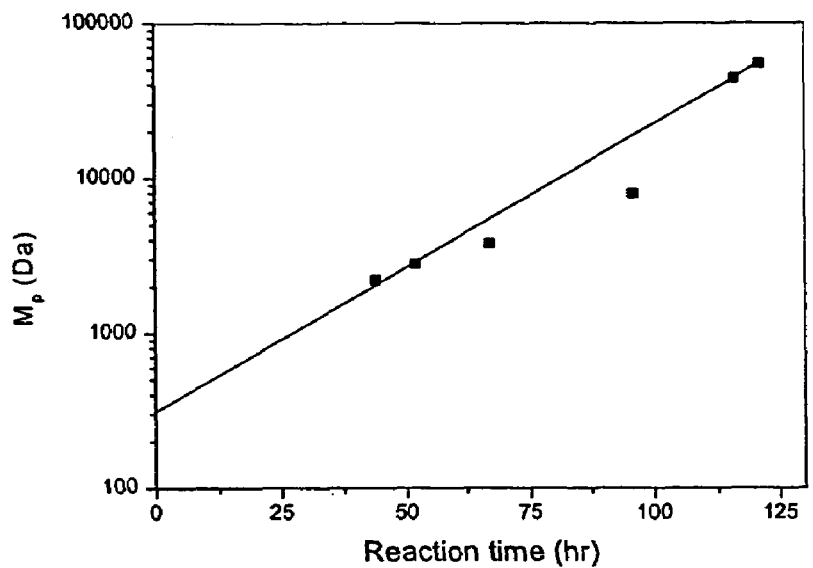
FIGS. 6a and b show reaction time dependencies of molecular weight of fluorinated polyether sulfone prepared by CaH$_2$ mediated reaction in propylene carbonate.
Figure 6:
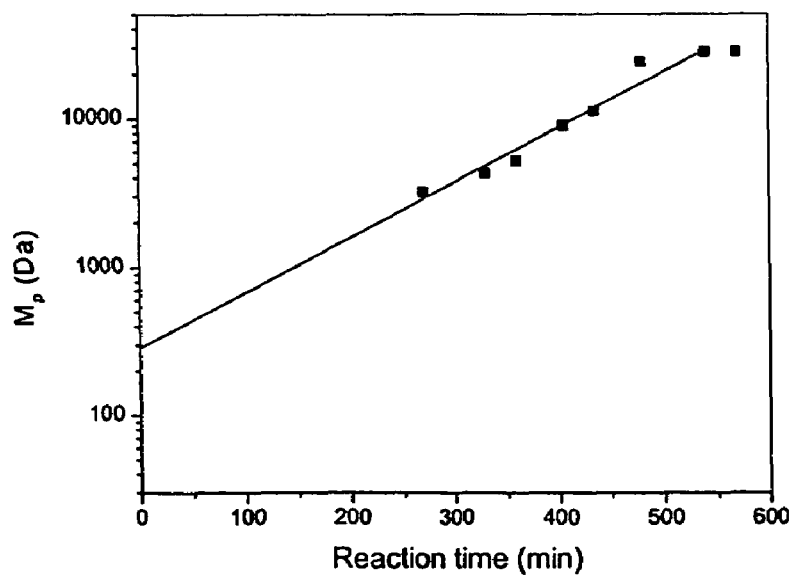

5. Solvent Effect,

Propylene carbonate (PC) has been tested for the reaction. As indicated in FIG. 1, comparing to DMAc, reaction in PC produce polymers with lower branch content, indicating a higher selectivity of the reaction. As shown in FIG. 6, MW increase with time in an exponential manner, indicating the solubility of K$^+$ is very low in the solution.

It should be noted that light degradation was found at high temperature (90° C.) when extended reaction time was used after the chain propagation finished.

6. Branching Structures by Side Reactions

Figure 8:
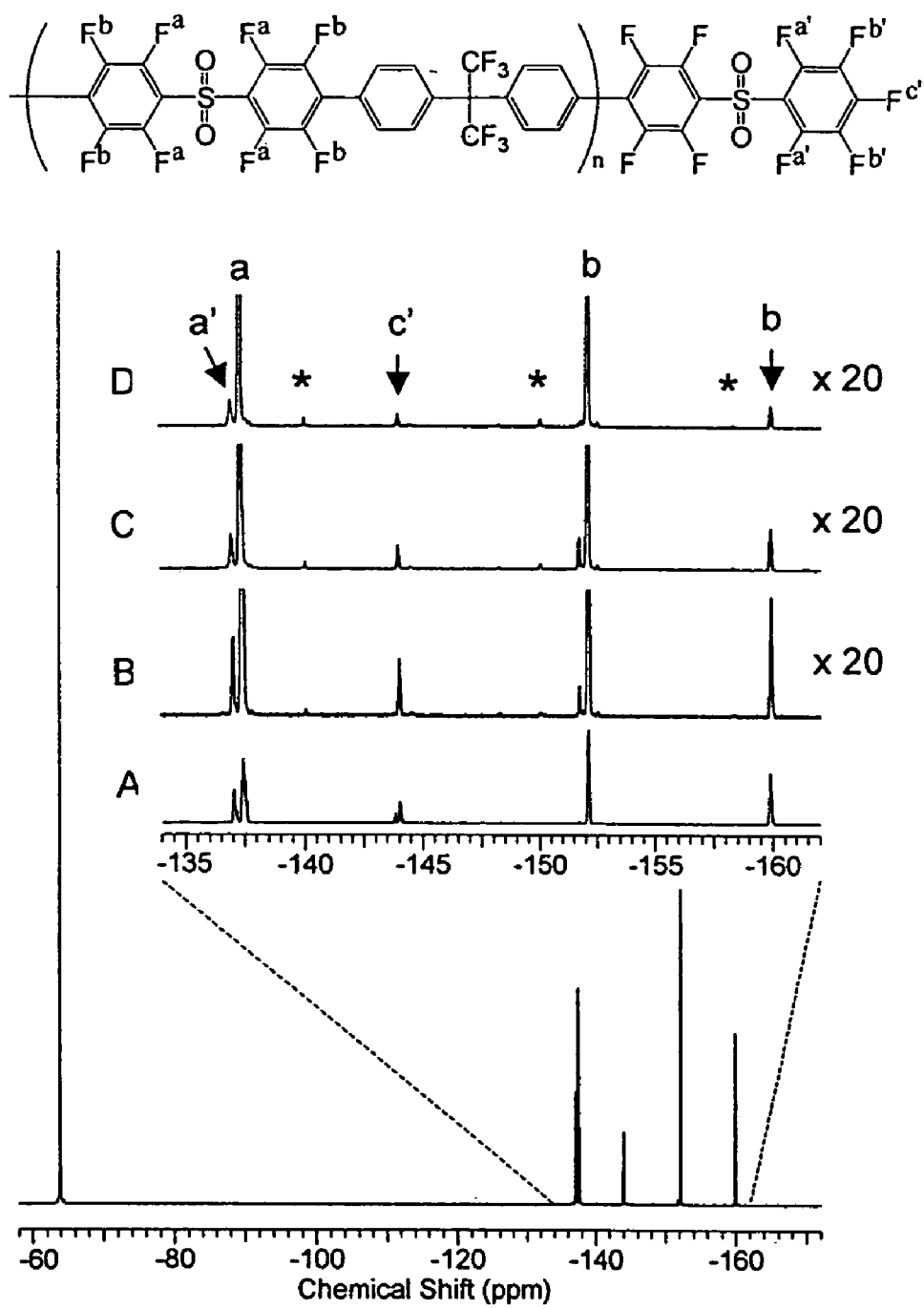
FIG. 8. 19F NMR of FPESO prepared in PC at 70° C. in the presence of CaH$_2$ and KF at the reaction time of (A) 2.0 hr, (B) 3 hr, (C) 5 hr, (D) 9 hr. (the signal in B, C, D, was enlarged 20 fold).

The formation of the branching structure was monitored by $^{19}$F NMR as shown in FIG. 8 for FPESO prepared in PC at 70° C. in the presence of CaH$_2$ and KF at the reaction time of (A) 2.0 hr, (B) 3 hr, (C) 5 hr, (D) 9 hr. (the signal in B, C, D, was enlarged 20 fold)

In these spectra the peak at −63.8 ppm is attributed to CF$_3$ group, and other two major peaks at −137.4 and −152.1 ppm are attributed to the ortho- and meta-fluorines respectively in the polymer chains. The aromatic region was expanded. The result indicates the end-group related peaks at −137.0, −144.0 and −154.9 ppm do not have notable intensity change after 6 hr reaction, means no more chain propagation after this time. At this time the peak related to the possible side reactions (marked with *) is very week. Even at extended reaction time (9 hr), the intensity of these peaks still less than that of end-group, indicating the structure related to the side reactions such as branching is less than 2 units per polymer chain or less than 1 in 50 monomer units. This result obviously confirmed that the CaH$_2$ mediated reaction sufficiently depressed the side reactions.

7. H$_2$O Effect.

H$_2$O is proved to cause side reactions such as hydrolysis of ether linkage in this polymerization. This effect to the CaH$_2$ (or CaO) mediated reaction was verified by using CaO as mediator, so that water was allowed in the reaction. FIG. 9 shows the effect on the reaction kinetics of different CaO that contained different level of H$_2$O (w %, measured by TGA) as shown below

| Type of CaO | Free H$_2$O | H$_2$O as Ca(OH)$_2$ | CO$_2$ as CaCO$_3$ |
|---|---|---|---|
| Flame dried | 0.00% | 0.00% | 8.0% |
| Vacuum dried | 0.00% | 2.0% | 0.9% |
| As-received | 0.04% | 3.7% | 0.9% |

FIG. 9 shows that the reaction speed increased with the increase of the water content in the solution. Traces of water will efficiently promote the reaction rate. However, with the water content level as high as 0.2% of the solution, a molecular weight reducing at the end of polymerization was found, indicating side reactions to cause chain cleavage. However, this side reaction seems depressed when the reaction was conducted at lower temperature as shown in FIG. 9. In this case, high molecular weight polymers were obtained.

CHEMICAL EXAMPLES

1. The Preparation of bis(tetrafluorostyrol)-hexafluorobisphenyl Diether by Using $CaH_2$ Pentafluorostyrene (FSt, 1.941 g, 10.0 mmol) and 4,4'-(hexafluoroisopropylidene) diphenol (6F-BPA, 1.345 g, 4.0 mmol) were dissolved in 12 mL DMAc in a 50 mL flask. The mixture was stirred until starting materials dissolved well. CsF (0.182 g, 1.20 mmol) and $CaH_2$ (0.42 g, 10.0 mmol) were added, the system was purged with Ar under freeze, and then heated at 95° C. for 8 hr. The solution was cooled down to room temperature prior to the removal of salt by filtration, then the solution was precipitated into acidic water, washed with water twice and dried under vacuum at room temperature for 24 hr to offer a white powder in a yield of 86%.

2. The Preparation of bis(tetrafluorostyrol)-hexafluorobisphenyl Diether by Using Molecular Sieves FSt (24.3 g, 125.0 mmol) and 6F-BPA (16.8 g, 50 mmol) were dissolved in a solvent mixture of 80 mL DMAc and 85 mL benzene in a 550 mL flask. A thimble filled with 20 mL 3 angstrom molecular sieves was inserted between condenser and flask. The mixture was stirred until starting materials dissolved well. $K_2CO_3$ (13.8 g, 100 mmol) was added, the system was purged with Ar under freeze, and then heated and refluxed (101° C.) for 3 hr. The solution was cooled down to room temperature prior to the removal of salt by filtration, then the solution was vacuum evaporated to remove benzene and was precipitated into acidic water, washed with water twice and dried under vacuum at room temperature for 24 hr to offer white powder in a yield of 91%.

3. The Preparation of bis(tetrafluorostyrol)-2,2,3,3,4,4,5,5-octafluorohexane-1,6-diether by Using NaH NaH (95%, 2.22 g, 88.0 mmol) was dispersed in 50 mL dry THF in a 250 mL flask, octafluorohexanediol (10.48 g, 40 mmol) in 20 mL THF was dropped into the NaH mixture at room temperature. The reaction was maintained until no gas released. Then FSt 19.41 g, 100 mmol) in 40 mL THF was added into the reaction mixture at one portion under vigorous stirring at 0° C., the solution was then warmed to room temperature and kept at RT for 30 min, followed by heating and refluxing for 2 hr. The reaction mixture was filtered to remove solid and then precipitated into acidic water, washed with water twice. A white powder with a yield of 80.1% was obtained after being dried under vacuum overnight.

4. The Preparation of tetrafluorostyrol-1H, 1H-perfluoroheptane ether by Using NaH NaH (95%, 2.78 g, 110 mmol) was dispersed in 120 mL dry THF in a 250 mL flask, 1H, 1H-perfluoroheptanol (35.0 g, 100 mmol) in 40 mL THF was dropped into the NaH mixture at room temperature. The reaction was maintained until no gas released. Then FSt 19.41 g, 100 mmol) in 40 mL THF was added into the reaction mixture at one portion under vigorous stirring at −10° C., the solution was then warmed to room temperature and kept at RT for 30 min, followed by heating and refluxing for 2 hr. The reaction mixture was filtered to remove solid and then was dropped into acidic water. Yellow viscous oily liquid was precipitated onto the bottom, which was washed with water twice and then vacuum dried. The product was purified by passing its solution in hexane through a short silica gel column, the then evaporating the solvent. This process offer a colorless liquid in a yield of 80.7%.

5. The Preparation of Fluorinated poly(arylene ether ketone) (FPEK) by CaH) Method with CsF as Catalyst in DMAc.

Bis(pentafluorophenyl) ketone (DBP, 1.086 g, 3.00 mmol), 6F-BPA (0.992 g, 2.95 mmol) were dissolved in 16 mL DMAc in a 50 mL flask. The reaction mixture was stirred until starting materials dissolved well. CsF (0.18 g, 1.2 mmol) and $CaH_2$ (0.25 g, 6.0 mmol) was added. The solution was protected with Ar, and stirred at 45° C. for 10 hr. The solution was filtered to remove salt, and then precipitated into acidic methanol. The powder was washed with methanol twice and dried under vacuum for 24 hr to offer a white powder in a yield of 85%. The polymer was characterized by GPC giving Mw=56,900 Da and PDI=3.0

6. The Preparation of FPEK Mediated by $CaH_2$ and Catalyzed by KF in DMAc.

DBP (1.086 g, 3.00 mmol), 6F-BPA, (0.992 g, 2.95 mmol) were dissolved in 20 mL DMAc in a 50 mL flask The mixture was stirred until starting materials dissolved well. KF (0.07 g, 1.2 mmol) and $CaH_2$ (0.25 g, 6.0 mmol) was added. The solution was protected with Ar, and stirred at 75° C. for 4 hr. The solution was filtered to remove salt, and then dropped into acidic methanol with agitation for precipitating polymer. The powder was washed with methanol twice and dried under vacuum for 24 hr to offer a white powder in a yield of 87%. The polymer was characterized by GPC giving Mw=82,000 Da and PDI=3.5.

7. The Preparation of FPEK Mediated by CaO and Catalyzed by KF in DMAc.

DBP (1.086 g, 3.00 mmol), 6F-BPA, (0.992 g, 2.95 mmol) were dissolved in 20 mL DMAc in a 50 mL flask. The mixture was stirred until starting materials dissolved well. KF (0.07 g, 1.2 mmol) and CaO (0.51 g, 9.0 mmol) was added. The solution was protected with Ar, and stirred at 70° C. for 6 hr. The solution was filtered to remove salt, and then dropped into acidic methanol with agitation for precipitating polymer. The powder was washed with methanol twice and dried under vacuum for 24 hr to offer a white powder in a yield of 88%. The polymer was characterized by GPC giving Mw=59.200 Da and PDI=3.1.

8. The Preparation of FSt-FPEK with FSt as End-Cappers Mediated by $CaH_2$ and Catalyzed by KF in DMAc.

FSt (1.281 g, 6.6 mmol), 6F-BPA, (10.087 g, 30.0 mmol) were dissolved in 80 mL DMAc in a 250 mL flask The mixture was stirred until starting materials dissolved well. CsF (0.21 g, 1.4 mmol) and $CaH_2$ (2.1 g, 50 mmol) was added. The solution was purged with Ar under freeze and was protected with Ar, and then stirred at 120° C. for 3 hr. The solution was cooled down to room temperature, followed by adding DBP (9.777 g, 27.0 mmol) in 30 mL DMAc. Then the solution was heated to 70° C. and stirred at this temperature for 4 hr. The solution was filtered to remove salt, and then dropped into acidic methanol with agitation for precipitating polymer. The powder was washed with methanol twice and dried under vacuum for 24 hr to offer a white powder in a yield of 88.8%. The polymer was characterized by GPC giving Mw=16,300 Da and PDI=1.8.

9. The Preparation of FSt-FPEK with FSt as End-Cappers and Pendant Groups by Molecular Sieve Method.

FSt (1.708 g, 8.8 mmol), 6F-BPA, (9.415 g, 28.0 mmol) were dissolved in DMAc/benzene (60/31, v/v) mixture in a 250 mL flask. A thimble filled with 20 mL 3 angstom molecular sieves was inserted between condenser and flask. The reaction mixture was stirred until starting materials dissolved well. $K_2CO_3$ (5.8 g, 42 mmol) was added, the system was purged with Ar under freeze, then protected with Ar, heated and refluxed (117° C.) for 4 hr in dark (bath temp, 150–155° C.). The solution was cooled down to RT and was added with DBP (7.605 g, 21 mmol), DMAc (30 mL) benzene (33 mL). The solution was purged with Ar again and then refluxed (108° C.) for 30 min (bath temp, 145° C.). The reaction mixture was filtered to remove the salt, evaporated under high vacuum to remove benzene and then precipitated into acidic methanol, washed with methanol twice to offer white powder in a yield of 86%. The polymer was characterized by GPC giving Mw=26,500 Da and PDI=2.8.

10. The Preparation of FSt-FPESO by Dehydrating Condensed Refluxing Solvents

Bis(pentafluorophenyl) sulfone (BPSO, 1.195 g, 3.00 mmol) 6F-BPA (0.975 g, 2.95 mmol) were dissolved in a solvent mixture of DMAc (12 mL), benzene (9 mL) and THF (21 mL) in a 100 mL flask, A thimble filled with 2.0 g $CaH_2$ was inserted between condenser and flask for trapping $H_2O$ in condensed solvent. The reaction mixture was stirred until starting materials dissolved well. The solution was added with $K_2CO_3$ followed by purging with Ar under freeze, and then heating and refluxing (80° C.) for 90 min. The solution was filtered to remove salt, and then concentrated (1/2) by vacuum evaporation and precipitated into acidic methanol The white powder with a yield of 81% was obtained after the sample was washed with methanol and than dried under vacuum overnight. Mw=22,000, PDI=2.3.

11. The Preparation of FPESO Mediated by $CaH_2$ and Catalyzed by KF in DMAc.

BPSO (1.195 g, 3.00 mmol) 6F-BPA (0.992 g, 2.95 mmol) were dissolved in 16 mL DMAc in a 50 mL flask. The mixture was stirred until starting materials dissolved well. KF (0.07 g, 1.2 mmol) and $CaH_2$ (0.25 g, 6.0 mmol) was added. The solution was protected with Ar, and stirred at 60° C. for 7.5 hr. The solution was filtered to remove salt, and then dropped into acidic methanol with agitation for precipitating polymer. The powder was washed with methanol twice and dried under vacuum for 24 hr to offer a white powder in a yield of 87%. The polymer was characterized by GPC giving Mw=70,000 Da and PDI=3.3.

12. The Preparation of FPESO Mediated by $CaH_2$ and Catalyzed by KF in PC.

BPSO (1.195 g, 3.00 mmol) 6F-BPA (0.992 g, 2.95 mmol) were dissolved in 16 mL PC in a 50 mL flask. The mixture was stirred until starting materials dissolved well. KF (0.07 g, 1.2 mmol) and $CaH_2$ (0.25 g, 6.0 mmol) was added. The solution was protected with Ar, and stirred at 60° C. for 12 hr. The solution was filtered to remove salt, and then dropped into acidic methanol with agitation for precipitating polymer. The powder was washed with methanol twice and dried under vacuum for 24 hr to offer a white powder in a yield of 87%. The polymer was characterized by GPC giving Mw=70,300 Da and PDI=3.0.

13. The Preparation of FPESO Mediated by $CaH_2$ and Catalyzed by CsF in PC.

BPSO (1.195 g, 3.00 mmol) 6F-BPA (0.992 g, 2.95 mmol) were dissolved in 16 mL PC in a 50 mL flask. The mixture was stirred until starting materials dissolved well. CSF (0.18 g, 1.2 mmol) and $CaH_2$ (0.25 g, 6.0 mmol) was added. The solution was protected with Ar, and stirred at 50° C. for 3 hr. The solution was filtered to remove salt, and then dropped into acidic methanol with agitation for precipitating polymer. The powder was washed with methanol twice and dried under vacuum for 24 hr to offer a white powder in a yield of 88%. The polymer was characterized by GPC giving Mw=89,200 Da and PDI=3.7.

14. The Preparation of FSt-FPESO with FSt as End-Cappers and Pendant Groups by Molecular Sieve Method.

FSt (1.708 g, 8.8 mmol), 6F-BPA, (9.415 g, 28.0 mmol) were dissolved in DMAc/benzene (40/24,v/v) mixture in a 250 mL flask. A thimble filled with 10 mL 3 angstrom molecular sieves was inserted between condenser and flask. The reaction mixture was stirred until starting materials dissolved well. $K_2CO_3$ (2.21 g, 16 mmol) was added, the system was purged with Ar under freeze, then protected with Ar, heated and refluxed (117° C.) for 4 hr in dark (bath temp, 150–155° C.). The solution was cooled down to RT, evaporated under vacuum to remove benzene and was added with BPSO (8.362 g, 21.0 mmol), $CaH_2$ (2.1 g, 50 mmol) and PC (120 mL). The solution was purged with Ar again and then heated at 60° C. for 90 min. The reaction mixture was filtered to remove the salt, and then precipitated into acidic methanol, washed with methanol twice to offer white powder in a yield of 84%. The polymer was characterized by GPC giving Mw=38,800 Da and PDI=3.1.

What is claimed is:

1. A process for preparing a linear fluorinated poly (arylene ether) comprising the repeating unit:

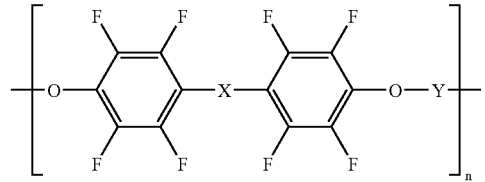

wherein n provides a molecular weight up to about 30,000 to 100,000 Da, X represents one of following groups: none, ketone, sulfone, sulfide, ether, hexafluoroisopropylidene, αω-perfluoroalkyleue, oxadiazole, and Y is 4,4'-(hexafluoroisopropylidene)-diphenyl, 4,4'-isopropylidene diphenyl, 3,3'-isopropylidene diphenyl, phenyl, or chlorinated phenol which process comprises reacting a bis(pentafluorophenyl) compound and a bisphenol or hydroquinone mediated by $CaH_2$ or CaO and in the presence of catalytic amount of an alkali metal salt in a polar aprotic solvent.

2. The process of claim 1 wherein the alkali metal salt is a fluoride.

3. The process of claim 2 wherein the alkali metal salt is selected from the group consisting of KF, RbF, and CsF.

4. The process of claim 1 wherein the polar aprotic solvent is selected from the group consisting of dimethyl acetamide, dimethyl sulfoxide, N-methyl-2-pyrrolidone (NMP), dimethyl formamide and propylene carbonate.

5. A highly fluorinated poly(arylene ether oxidazole) comprising repeating units of the formula:

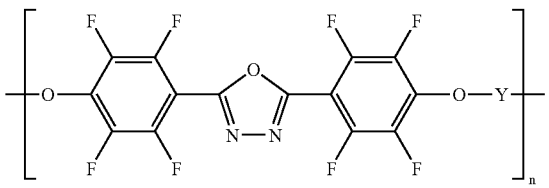

wherein n and Y are as defined in claim 1.

6. The process of claim 1 mediated by $CaH_2$, and wherein the polar aprotic solvent is propylene carbonate.

* * * * *